US006483518B1

United States Patent
Perry et al.

(10) Patent No.: US 6,483,518 B1
(45) Date of Patent: Nov. 19, 2002

(54) REPRESENTING A COLOR GAMUT WITH A HIERARCHICAL DISTANCE FIELD

(75) Inventors: Ronald N. Perry, Cambridge, MA (US); Sarah F. Frisken, Arlington, MA (US); Thouis R. Jones, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 09/369,819

(22) Filed: Aug. 6, 1999

(51) Int. Cl.$^7$ .............................................. G06T 15/00
(52) U.S. Cl. ..................................................... 345/590
(58) Field of Search ................................ 345/590, 419, 345/589, 591, 593, 597, 600

(56) References Cited

U.S. PATENT DOCUMENTS

| | | | |
|---|---|---|---|
| 4,791,583 A | 12/1988 | Colburn | 364/522 |
| 5,542,036 A | 7/1996 | Schroeder et al. | 395/124 |
| 5,740,076 A | 4/1998 | Lindbloom | 364/514 |
| 5,982,992 A | * 11/1999 | Warldron | 358/525 |
| 6,400,843 B1 | * 6/2002 | Shu et al. | 345/590 |

OTHER PUBLICATIONS

Aref et al., "Efficient Window Block Retrieval in Quadtree–Based Spatial Databases"; *GeoInformatica*, 1(1), pp. 59–91 (Apr. 1997).

Avila et al., "A Haptic Interaction Method for Volume Visualization"; In *Proceedings of Visualization '96*, pp. 197–204, IEEE, 1996.

J. Baerentzen, "Octree–based Volume Sculpting", Proc. Late Breaking Hot Topics, IEEE Visualization '98, pp. 9–12, 1988.

J. Bloomenthal, "Polygonization of Implicit Surfaces", Technical Report, Xerox Parc, EDL–88–4, Dec., 1988.

D. Breen et al., "3D Scan Conversion of CSG Models into Distance Volumes", Proc. IEEE Symposium on Volume Visualization, pp. 7–14, 1998.

T. DeRose, et al., "Subdivision Surfaces in Character Animation", Proc. SIGGRAPH '98, pp. 85–94, 1998.

M. Eck et al., "Automatic Reconstruction of B–spline Surfaces of Arbitrary Topological Type", Proc. SIGGRAPH '96, pp. 325–334, 1996.

S. Fang et al., "Volumetric–CSG—A Model–Based Volume Visualization Approach", in Proc. $6_{th}$ International Conference in Central Europe on Computer Graphics and Visualization, pp. 88–95, 1998.

(List continued on next page.)

*Primary Examiner*—Phu K Nguyen
(74) *Attorney, Agent, or Firm*—Dirk Brinkman

(57) ABSTRACT

The invention provides a method for representing a device color gamut as a detail directed hierarchical distance field. A distance field representing the device color gamut is enclosed with a bounding box. The enclosed distance field is partitioned into a plurality of cells. Each cell has a size corresponding to detail of the continuous distance field and a location with respect to the bounding box. A set of values of the enclosed distance field is sampled for each cell. A method for reconstructing the portion of the distance field enclosed by the cell is specified. The size, the location, the set of values, and the method for reconstructing is stored in a memory to enable reconstruction of the device color gamut by applying the reconstruction methods of the cells to the values.

12 Claims, 27 Drawing Sheets

OTHER PUBLICATIONS

Galyean et al., "Sculpting: An Interactive Volumetric Modeling Technique"; *Computer Graphics*, 25(4), pp. 267–274 (Jul. 1991).

S. Gibson; "Using Distance Maps for Accurate Surface Representation in Sampled Volumes"; *Proceeding 1998 IEEE Symposium on Volume Visualization*; pp. 23–30 (Oct. 1998).

S. Gibson, "Calculating Distance Maps from Binary Segmented Data", Technical Report, MERL, TR99–26, 1999.

S. Gibson, "Constrained Elastic Surface Nets: Generating Smooth Surfaces from Binary Segmented Data", Proc. MICCAI '98, pp. 888–898, 1998.

H. Hoppe et al., "Surface Reconstruction from Unorganized Points", Proc. SIGGRAPH '92, pp. 71–78, 1992.

H. Hoppe et al., "Piecewise Smooth Surface Reconstruction", Proc. SIGGRAPH '94, pp. 295–302, 1994.

A. Khodakovsky et al., "Fine Level Feature Editing for Subdivision Surfaces", Proc. Solid Modeling and Applications '99, pp. 203–211, 1999.

J. Lengyel et al., "Real–time Robot Motion Planning using Rasterizing Computer Graphics Hardware", Proc. SIGGRAPH '90, pp. 327–335, 1990.

W. Lorensen et al., "Marching Cubes: A High Resolution 3D Surface Construction Algorithm", Computer Graphics, vol. 21, No. 4, pp. 163–169, 1987.

B. Naylor, "SCULPT: An Interactive Solid Modeling Tool", Proc. Graphics Interface '90, pp. 138–148, 1990.

S. Parker et al., "Interactive Ray Tracing for Iso–Surface Rendering", Proc. IEEE Visualization '98, pp. 233–245, 1998.

B. Payne et al., "Distance Field Manipulation of Surface Models", IEEE Computer Graphics and Applications, pp. 65–71, 1992.

Raviv and G. Elber, "Three Dimensional Freeform Sculpting Via Zero Sets of Scalar Trivariate Functions", Proc. Solid Modeling and Applications '99, pp. 246–257, 1999.

A. Ricci, A Constructive Geometry for Computer Graphics, Computer Journal, vol. 16, No. 2, pp. 157–160, 1973.

A. Rockwood, "The Displacement Method for Implicit Blending Surfaces in Solid Models", ACM Transactions on Graphics, vol. 8, No. 4, pp. 279–297, 1989.

H. Samet, "Spatial Data Structures", Appears in *Modern Database Systems: The Object Model, Interoperability, and Beyond*, W. Kim, ed., Addison–Wesley, pp. 361–385, 1995.

R. Szeliski et al., "Surface Modeling with Oriented Particle Systems", Proc. SIGGRAPH '92, pp. 185–194, 1992.

S. Wang et al., "Volume Sculpting", Proc. 1995 Symposium on Interactive 3D Graphics. pp. 151–156, 1995.

A. Witkin et al., "Using Particles to Sample and Control Implicit Surfaces", Proc. SIGGRAPH '94, pp. 269–277, 1994.

\* cited by examiner

300

| Fundamental Operations | | |
|---|---|---|
| 1010 | 1020 | 1030 |
| PointInHDF | (Point *p, HDF *hdf) | Boolean |
| *PointInHDFCell | (Point *p, HDF *hdf) | Cell |
| *PointInHDFCellAtSomeFixedLevel | (Point *p, HDF *hdf, Interger level) | Cell |
| *PointInHDFCellAtFixedErrorTolerance | (Point *p, HDF *hdf, Float errorTol) | Cell |
| DistanceToSurfaceInSurfaceCell | (Point *p, HDF *hdf, Cell *cell) | Float |
| DistanceToSurfaceInNonSurfaceCell | (Point *p, HDF *hdf, Cell *cell, Float errorTol) | Float |
| PointInsideObject | (Point *p, HDF *hdf, Cell *cell) | Boolean |
| *ReconstructApperaranceParams | (Point *p, HDF *hdf, Cell *cell) | Vector |
| *ReconstructComputationalParams | (Point *p, HDF *hdf, Cell *cell) | Vector |
| *ComputeHDFGradient | (Point *p, HDF *hdf, Cell *cell) | Vector |
| *ComputeHDFPartialDerivatives | (Point *p, HDF *hdf, Cell *cell, BitVector *whichPartials) | Vector |
| *LocateClosestPointOnSurface | ( Point *p, HDF *hdf, Cell *cell, Float eps PositionError | Point |
| PointBasedPartitionPredicate | (HDF *hdf, Cell *cell, Point *testPoints, ObjDistAndParamFunction dpFunc, Float epsDist, Float epsParams) | Boolean |
| CellBasedPartitionPredicate | (HDF *hdf, Cell *cell, Point *predictionPoints, Point *validationPoints, Float epsDist, Float epsParams) | Boolean |
| PartitionCell | (HDF *hdf, Cell *parentCell) | Void |
| CombinePredicate | (HDF *hdf, Cell *parentCell, Float epsDist, Float epsParams) | Boolean |
| CombineCell | (HDF *hdf, Cell *parentCell) | Void |
| *BuildLevelOfDetailHDF | (HDF *hdf, Float epsDist, Float epsParams) | HDF |
| *BuildLevelOfDetailSurfaceCellList | (HDF *hdf, Float epsDist, Float epsParams) | Cell |
| *BuildMaxLevelHDF | (HDF *hdf, Integer maxLevel) | HDF |
| *BuildMaxLevelSurfaceCellList | (HDF *hdf, Integer maxLevel) | Cell |
| *BuildViewDependentHDF | (HDF *hdf, Point *eyePosition, Matrix ObjToSampleSpaceTransform, Float epsSampleSpaceError, Float epsNormal, Float epsParams) | |
| IsSurfaceCellBackFacing | (HDF *hdf, Cell *cell, Vector *rayDirection) | Boolean |

FIG. 10

REPRESENTING A COLOR GAMUT WITH A HIERARCHICAL DISTANCE FIELD

FIELD OF THE INVENTION

The invention relates generally to the field of color reproduction, and more particularly to accurately converting and rendering colors in output devices having only a limited range of colors.

BACKGROUND OF THE INVENTION

Surface Representations

A representation of "shape" of an object or model is required in many fields such as computer-aided design and manufacturing, computational physics, physical modeling, and computer graphics. Three common representations for shape are parametric surface models, implicit surfaces, and sampled volume data.

Parametric Surface Models

Parametric surface models define the surfaces of an object as a collection of primitives such as polygons, spline patches, or subdivision surfaces that are defined parametrically. Most graphics systems use a parametric representation. As stated by Alyn Rockwood in "The displacement method for implicit blending surfaces in solid models," ACM Transactions on Graphics, Vol. 8, No. 4, 1989, "parametric surfaces are usually easier to draw, tessellate, subdivide, and bound, or to perform any operation on that requires a knowledge of 'where' on the surface." However, parametric surface models are difficult to combine, sculpt, or deform. Moreover, parametric surface models cannot be used for solid objects because they do not represents the interior of objects.

Implicit Surfaces

Implicit surfaces are represented by an implicit function, $f(x)$. The function is defined over the space including the surface. The surface of the object is expressed as an iso-surface of an implicit function: i.e., $f(x)=c$. Implicit surfaces can represent object interiors, can easily blend together, can morph between object shapes, and can perform constructive solid geometry (CSG) operations on objects. Implicit surfaces can also detect inside versus outside of objects. However, as stated by Bloomenthal in *Introduction to Implicit Surfaces*, Morgan Kaufman Publishers, 1997, while the "natural conversion from the parametric (2D) space of a surface to the geometric (3D) space of an object is a fundamental convenience, and partially accounts for the popularity of parametric surfaces . . . there is no comparable mechanism for implicit surfaces." In other words, given the equation defining an implicit surface it is hard to locate points on the surface in object space. In addition, it can be difficult to find implicit functions for some arbitrary objects.

Sampled Volume Data

Sampled volume data represent objects and models in an array of sampled intensity values on a regular or irregular grid. Volume data are usually generated from 3D image data or from numerical simulation. Like implicit surfaces, sampled volume data represent object interiors, and the sampled volume data can be used in many of the same ways that implicit surfaces are used. However, the accuracy of the object representation is limited by the resolution of the sampling. Sampled data are usually intensity-based so that an object is distinguished from the background and from other objects by the sampled intensity values. In general, this means that the sampled intensities change abruptly at object surfaces to introduce high spatial frequencies into the data. High sampling rates are required to avoid aliasing artifacts and jagged edges in rendered images. Because high sampling rates increase memory requirements and rendering times, the quality of the represented surface must be traded-off with memory requirements and rendering speed.

Distance Fields and Distance Maps

A scalar field is a single-valued N-dimensional function that is defined over a given region. A distance field is a scalar field that represents the "distance" to a surface, $\delta S$, of an object, S. A "distance" is defined for each p contained in the domain of the field by $D(p, S)=\text{minabs}\{\|p-q\|\}$, for all points q on the surface $\delta S$, where $\text{minabs}\{A\}$ determines the signed element of a set A with the minimum absolute magnitude, and $\|\sim\|$ represents a distance metric with the following characteristics: the distance metric has a value of zero everywhere on $\delta S$ and the metric is signed to permit the distinction between the inside and the outside of S. A surface at a non-zero iso-surface of the distance field can be easily specified by adding a scalar offset to the distance field.

A sampled distance field is a set of values sampled from the distance field along with either an implicit or explicit representation of the sampling location. The sampled values can include distance values and associated distance computations such as the gradient of the distance field and/or other partial derivatives of the distance field.

One example of a distance metric is the Euclidean distance in which the distance field at any point p becomes the signed Euclidean distance from p to the closest point on the object surface. A distance map is defined to be the sampled Euclidean distance field where the sample locations lie on a regular grid. Distance maps have been used in several applications.

For example, Lengyel et al. used distance maps for robotic path planning in "Real-time robot motion planning using rasterizing computer graphics hardware," SIGGRAPH, pp. 327–335, 1990. Others have used distance maps for morphing between two objects. See "Distance field manipulation of surface models," Payne et al. in IEEE Computer Graphics and Applications, January, 1992 for an example. Distance maps have also been used for generating offset surfaces as discussed by Breen et al. in "3D scan conversion of CSG models into distance volumes," Proceedings of the IEEE Volume Visualization Symposium, 1998. Gibson used distance maps to represent precision surfaces for volume rendering in "Using distance maps for smooth surface representation in sampled volumes," Proceedings of the IEEE Volume Visualization Symposium, 1998. Four methods for generating distance maps from binary sampled volume data are compared by Gibson in "Calculating distance maps from binary segmented data," MERL Technical Report TR99-26, April, 1999.

Because the Euclidean distance field varies slowly across surfaces, distance maps do not suffer from the aliasing problems of sampled intensity volumes. Smooth surfaces can accurately be reconstructed from relatively coarse distance maps as long as the surface has low curvature. However, because distance maps are regularly sampled, they suffer from some of the same problems as sampled volumes. For example, the size of the distance map is determined by a combination of the volume of the object and the finest detail that must be represented. Hence, volumes that have some fine detail surfaces require large distance maps, even when only a small fraction of the volume is occupied by the fine-detail surfaces. In addition, distance maps are typically rendered by using volume rendering techniques. Volume rendering techniques can be very slow, and may require many seconds or minutes per frame for high quality rendering of reasonably sized volumes.

Spatial Data Structures for Hierarchical Object Representation

A number of methods are known for hierarchically organizing spatial data for efficient memory usage, rendering, or physics modeling. Examples of spatial data structures are presented in two books by Samet, "The Design and Analysis of Spatial Data Structures," and "Applications of Spatial Data Structures," both published by Addison-Wesley in 1989.

Octrees recursively decompose three-dimensional space into eight equal-sized octants or nodes in order to organize data hierarchically. Region octrees divide data into nodes corresponding to uniform regions of the volume image. When the image data is binary, the resultant tree has two types of nodes, interior nodes and exterior nodes. Three-color octrees classify nodes as being interior, exterior or boundary nodes, where boundary nodes intersect object surfaces. Boundary nodes are subdivided recursively to the highest resolution of the volume data. Object surfaces are rendered by drawing the boundary leaf nodes.

Three-color octrees have been applied to volume data to reduce the amount of storage required for interior and exterior regions, and to provide an efficient structure to speed up rendering and collision detection. However, representing surfaces by boundary nodes on a uniform grid results in problems similar to those found in sampled volumes. Rendered images are subject to aliasing artifacts unless surfaces are sampled at very high frequencies. The sampling rate, which corresponds to the resolution of the boundary nodes, is determined by the highest required resolution of the rendered image rather than the amount of detail present in the surface. Hence, a three-color octree representation can require a significant amount of memory even for relatively flat surfaces.

Converting Sampled Volume Data to a Polygon Model

The Marching Cubes algorithm and its successors, first described by Lorensen and Cline in "Marching Cubes: a high resolution 3D surface construction algorithm," in Computer Graphics, 21(4) pp. 163–169, 1987, is the most commonly used method for fitting a triangle model to the iso-surface of a regularly sampled volume. For each cell containing the iso-surface, a table lookup determines a set of triangles that approximate the iso-surface within the cell. This method is limited to volumes sampled on a rectilinear grid because of their approaches for resolving topological ambiguities and guaranteeing crackless surfaces.

Gibson presented a method for converting a binary sampled volume to a triangle model in "Constrained Elastic SurfaceNets: generating smooth surfaces from binary segmented data" in the Proceedings of MICCAI'98, pp. 888–898, 1998. That method fits a linked net of nodes over the surface of a binary object in a regularly sampled volume. The positions of the nodes are then adjusted to smooth out the shape of the surface net subject to constraints defined by the original node placement. That method does not fit surfaces to gray-scale data.

Converting Point Clouds to Parametric Surfaces

Hoppe et al, in "Surface reconstruction from unorganized points", Proc. SIGGRAPH'92, pp. 71–78, 1992, and "Piecewise smooth surface reconstruction", Proc. SIGGRAPH'94, pp. 295–302, 1994, describe a method that converts a set of unorganized points to a triangular model and subsequently fits a subdivision surface to the output triangle model. The method generates a distance map from the point cloud and then uses Marching Cubes to generate the triangle model. This method is limited by the resolution of the distance map and by the accuracy of the distance map that can be estimated from the unorganized points.

Converting Implicit Surfaces to Triangles

Bloomenthal, in "Polygonization of implicit surfaces," Technical Report, Xerox Parc, EDL-88-4, December, 1988, discloses a method for converting a surface expressed as a single implicit function to triangles. In an intermediate temporary data structure, the function is evaluated at vertices of cells intersecting the surface. The intermediate representation is polygonized by joining points on the twelve cell edges that are on the desired iso-surface expressed by the implicit function. He tracks the surface by propagating cells beginning at an "initial seed cell that intersects the surface, and is small in comparison with surface detail." Alternatively, he converges to the surface by only "subdividing those cubes that intersect the surface." Rendering and editing the temporary data structure are not described.

Rendering Distance Maps

Distance maps can be rendered directly without converting them to a parametric model as described by Gibson in "Using distance maps for smooth surface representation in sampled volumes," Proceedings of the IEEE Volume Visualization Symposium, 1998. However, the volume rendering approach used is very slow for reasonably large volumes.

Surface Editing for Parametric Surfaces

Editing parametric surfaces is a challenging problem. The most commonly used parametric surfaces in engineering design are non-uniform rational B-spline (NURB) surfaces, for which surface editing is performed by a process called trimming. However, as stated by DeRose et al., in "Subdivision surfaces in character animation," Proc. SIGGRAPH'98, pp. 85–94, 1998, this process "is expensive and prone to numerical error."

A number of methods for editing other types of parametric surfaces have been presented, but in general, they are complex and non-intuitive, and it is difficult to control the quality of the edited surface. For example, Naylor represents solid objects and tools as a binary space partitioned (BSP) tree in "SCULPT: an interactive solid modeling tool," Proc. Graphics Interface'90, pp. 138–148, 1990. He performs union, difference and intersection operations between a tool and an object by locating the tree within the object BSP tree and editing the object tree. He illustrates how difficult it is to sculpt solid models of even relatively simple objects. The examples of carved objects that are presented have low resolution and rough edges around the carved regions.

Khodakovsky and Schroder presented a method for carving subdivision surfaces in "Fine level feature editing for subdivision surfaces" in the Proceedings of Solid Modeling and Applications, pp. 203–211, 1999. Again, their approach is quite complex, even for relatively simple editing operations on relatively simple object models. It is hard to imagine using this method for free-form sculpting.

Raviv and Elber recently described a method for representing an object as a collection of scalar uniform trivariate B-splines defined over a set of arbitrarily oriented cubic patches. The B-splines are controlled by a large number of control coefficients (typically $2^{15}$), and the object shape is edited by modifying these coefficients. The method cannot provide fine detail editing such as corners and small holes without excessive memory and computation times. The results presented in the paper show poor surface detail and the reported editing and rendering times are very slow.

Sculpting Sampled Volume Data

Several systems have been developed for sculpting volumetric data. These systems represent objects as density maps, where a density of one corresponds to object interiors and a density of zero corresponds to object exteriors. These systems typically include a boundary region around each object where the density varies from zero to one in order to avoid aliasing artifacts during rendering. All of these systems use a regularly sampled volume for volume editing, which involves adding or subtracting material from a non-deformable volume object. In addition, Barentzen discusses the use of a three-color octree for storing and rendering the density map. For details, see: Galyean and Hughes, "Sculpting: an interactive volumetric modeling technique," Proceedings SIGGRAPH'91; Wang and Kaufman, "Volume sculpting," Proceedings 1995 Symposium on Interactive 3D Graphics"; Avila and Sobierajski, "A haptic interaction method for volume visualization," Proceedings IEEE Volume Visualization'96; and Baerentzen, "Octree-based volume sculpting," Proceedings Late-breaking Hot Topics, IEEE Visualizaiton'98.

There are several limitations to these systems. First, the use of filtered boundary regions reduces aliasing but results in smoothed and rounded corners and edges. The smoothing is a result of the filters used on the data and could be reduced by using distance maps instead of low-pass filters. Second, because the objects are stored in a regular grid, the resolution of the object surface is limited by the grid resolution. Hence, density maps require large volumes when there is fine detail present, even when only a small fraction of volume is occupied by fine-detail surfaces. Third, because of the large volume size, rendering of density maps is slow. While Barentzen's proposed octree-based density map reduces these problems, the problems of three-color octrees apply. In addition, editing is limited by the pre-determined highest resolution of the octree.

Schroeder et al, in "Implicit modeling of swept volumes and swept surfaces," U.S. Pat. No. 5,542,036, describe a method for computing a computer model of swept volumes. A composite distance map is computed by assigning, to each sample point, the minimum distance to the object over time as the object is swept through space. A surface of the swept volume is converted to triangles via Lorensen and Cline's Marching Cubes algorithm. The distance map is of fixed resolution and is regularly sampled so the problems of distance maps apply.

Colburn presents a method for generating fillets and rounds on the edges and corners of solid models that has some similarities to editing methods for volume data in "Method for global blending of computer modeled solid objects using a convolution integral," U.S. Pat. No. 4,791,583. In that method, solid objects are represented in an octree and each boundary cell is assigned a value determined by the percent of its volume occupied by the object. Rounding is achieved by evaluating the convolution of cell values with a spherical Gaussian filter at points along rays that are perpendicular to the original object surface. The rounded surface is reconstructed through the point on each ray where the convolution evaluates to a constant iso-value. The method is specifically limited to adding rounds and fillets on the edges and corners of solid models. In addition, the resolution of the object representation is limited by the size of the boundary cells and hence limits the accuracy of the reconstructed surface.

Summary of Problems with the Prior Art

Each of the three common surface representations discussed above has limitations. Parametric surface models do not represent interiors and do not provide an easy means for detecting inside vs. outside. Implicit surfaces do not have a natural conversion from the expression for the surface to points in 3D space and hence they are harder to render than parametric surfaces. Sampled volume data are subject to artifacts and hence must be sampled at high frequencies in order to represent surfaces accurately. These high sampling rates require large amounts of memory and long rendering times.

Distance maps can reduce aliasing artifacts in sampled volumes, but because distance maps are sampled on a regular grid, they still require a trade-off between memory requirements and the finest detail that can be represented. In addition, volume rendering of distance maps is slow, limiting real-time interactivity. The three-color octree could be used with distance maps to improve rendering rates and reduce the amount of storage necessary for object interiors and exteriors.

It is desirable to further reduce the amount of storage by allowing boundary leaf nodes whose resolution could be tailored to local surface detail. For example, it would be desirable to be able to represent a fine curve on a large, relatively smooth object without having to represent the surface of the entire object at excessively high resolution. Hence, there is a need for a representation of sampled distance fields that is detail-directed, so that the resolution of boundary leaf nodes is adapted to local detail in the surface.

As discussed above, volumetric representations are well suited for editing and sculpting graphical objects. However, existing density map methods are problematic because of excessive smoothing of edges and corners and because of data storage and rendering requirements. In addition, because the resolution of the sampled data is pre-determined, the detail that can be achieved during editing is limited before editing begins.

Hence there is a need for a detail-directed volume representation for sculpting graphical objects. The representation should be flexible so that if a sharp corner were generated or removed during editing, the representation would locally adapt to resolution requirements. As well as the object representation, techniques for editing, interacting with, and rendering objects represented by the structure are required. In addition, methods for converting the new representation to and from standard representations are required.

SUMMARY OF THE INVENTION

The invention provides a method for representing a device color gamut as a detail directed hierarchical distance field. A distance field representing the device color gamut is enclosed with a bounding box. The enclosed distance field is partitioned into a plurality of cells. Each cell has a size corresponding to detail of the continuous distance field and a location with respect to the bounding box.

A set of values of the enclosed distance field is sampled for each cell. A method for reconstructing the portion of the distance field enclosed by the cell is specified. The size, the location, the set of values, and the method for reconstructing is stored in a memory to enable reconstruction of the devide color gamut by applying the reconstruction methods of the cells to the values.

As an advantage, the hierarchical distance field enables one to test inside vs. inside of the device color gamut correct to within a small error tolerance, and measure of how close a color is to the gamut surface within a surface representation error. This information can be used to replace colorts that are outside the gamut with colors inside the device color gamut. Furthermore, the hierarchical distance field representation uses less memory than prior art distance field representation since the present representation adapts to the detail of the color gamut surface.

BRIEF DESCRIPTION OF THE DRAWINGS

FIG. 10 is a block diagram of fundamental HDF operations;

DETAILED DESCRIPTION OF THE PREFERED EMBODIMENTS

Introduction Hierarchical Distance Fields

The present invention provides detail-directed hierarchical distance fields (HDFs). In the following, the data structures used to store these distance fields in a memory are described first. Then, fundamental operations that can be applied to the data structures will be recited, followed by details on methods for generating, converting, rendering and editing the data structures. Finally, a specific applications for sculpting and color management with the detail-directed hierarchical distance fields is given.

Figure 1:
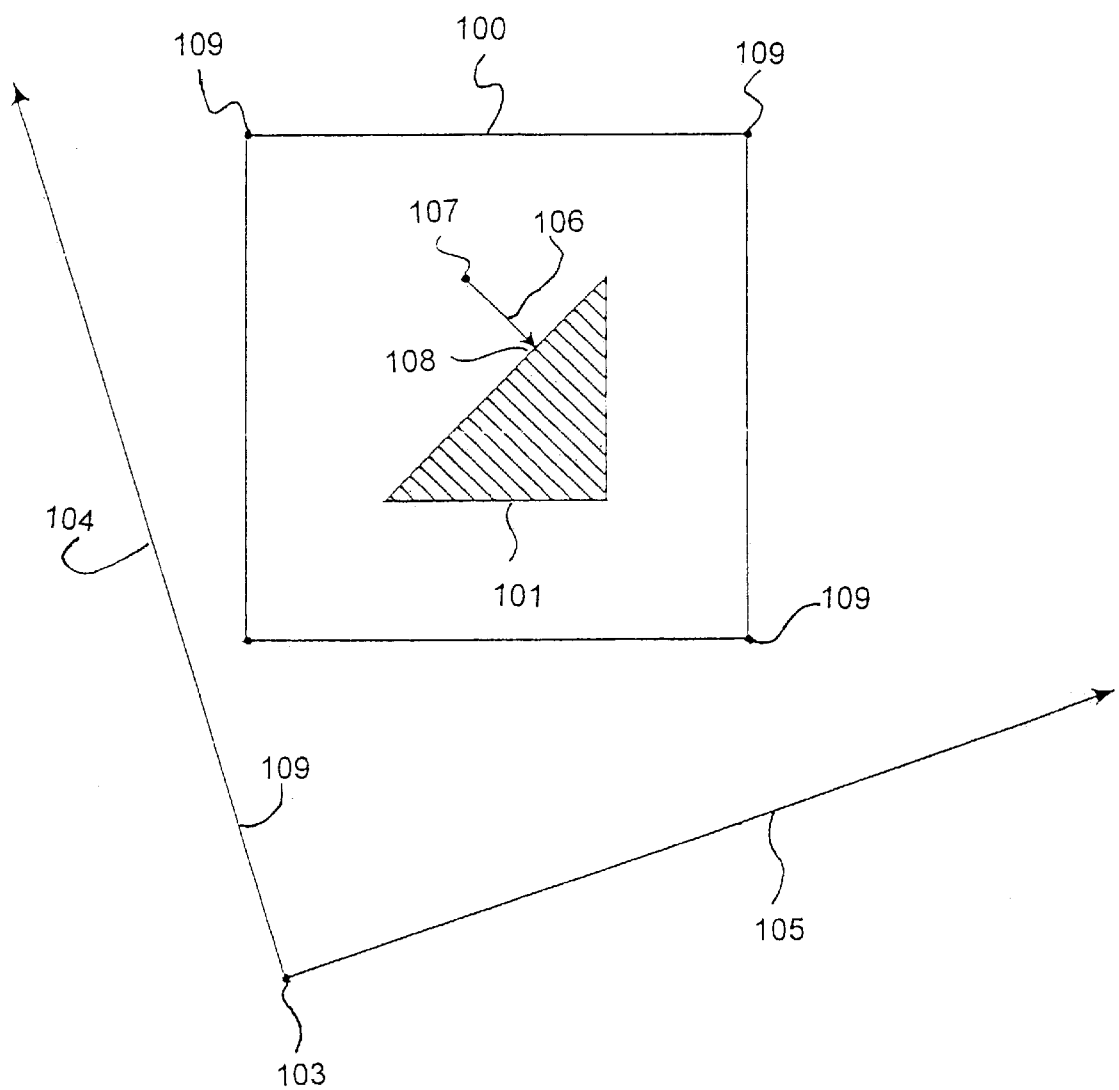
FIG. 1 is a bounding box enclosing an object to be represented by a detailed directed hierarchical distance field (HDF) according to the invention.

FIG. 1 shows a bounding box 100 enclosing a portion of a distance field associated with an object 101. In 2D, the bounding box 100 is located in some world coordinate space defined by an origin 103 and axes 104 and 105. The space enclosed by the bounding box is defined in terms of the coordinates of the world coordinate space. The size and location of the bounding box is specified by its vertices 109.

In this example, the space is two-dimensional and the object is a graphical element (a triangle). It should be understood that the invention can be extended to spaces having higher dimension and to other types of objects or models, for example color models. The object surface is defined to be the boundary of the object. In two-dimensional space, the boundary is the outside edge of the object. In three and higher dimensional space, the boundary is the three or higher dimensional surface of the object.

The signed distance field associated with the object 101 represents the distance 106 from any point in space 107 to the closest point 108 on the surface of the object 101. The sign of the distance field distinguishes between points that are inside and outside of the object surface. For example, positive distances are associated with points inside of the surface, negative distances are associated with points outside of the surface, and a distance of zero is associated with points that lie on the surface.

In order to represent the distance field on a computer, the distance field can be sampled at representative locations within the bounding box 100. One approach is to partition the bounding box enclosing the distance field into cells and to sample the distance field at vertices of the cells. If the bounding box is partitioned into a regular array of rectilinear cells, then the stored distance values represent a distance map. However, it should be understood that the cells can be any shape including rectangular solids, spheres, or arbitrary polyhedra and that the cells do not necessarily have to fully populate the bounding box.

It is the intent to provide a data structure representation for the sampled distance field that is efficient in terms of memory usage while allowing the distance field to be represented with arbitrary accuracy. More particularly, in the hierarchical distance field (HDF) described herein, the distance field is sampled at high enough resolution so that it can be reconstructed to a pre-determined accuracy and the sampling is detail-directed so that higher sampling rates are used in regions where the distance field has more detail and lower sampling rates are used in regions where the distance field varies smoothly.

Figure 2:
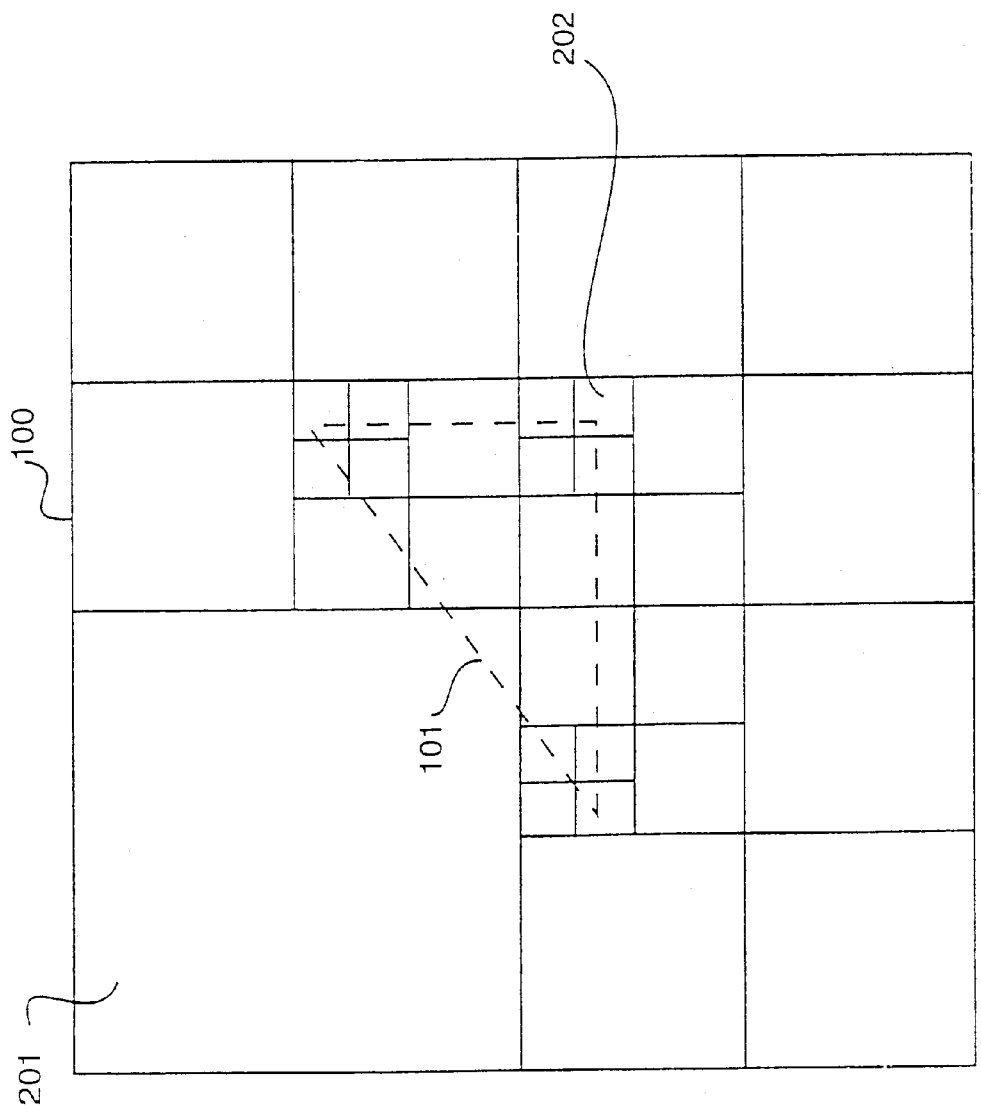
FIG. 2 is a bounding box enclosing partitioned cells of the HDF according to the invention.

Accordingly as shown in FIG. 2, the bounding box 100 enclosing a portion of the distance field representing object 101 has been partitioned into cells 201–202 which have various sizes, and locations with respect to the bounding box. Large cells 201 are used where the distance field detail varies relatively slowly, and small cells 202 are used near object corners where the distance field has more detail and high resolution is desired.

Figure 3:
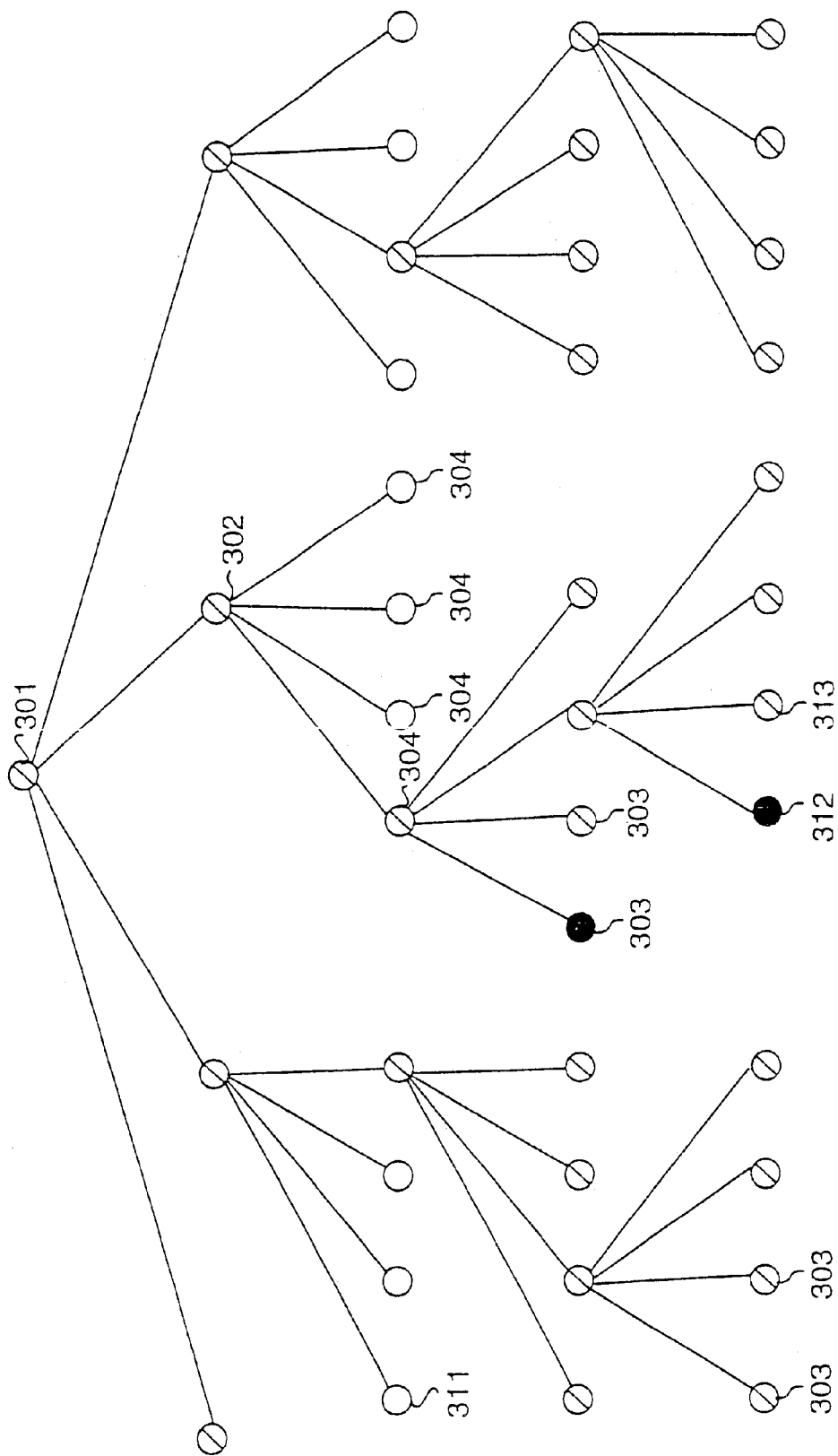
FIG. 3 is a tree diagram of a HDF according to a preferred embodiment.

The cells partitioning the distance field can be organized in a spatial data structure for more efficient memory storage and access. For example, as shown in FIG. 3, the cells can be arranged in memory as a tree 300 such as a quadtree for a 2D distance field, or an octree for a 3D distance field. As described below, other data structures such as linked lists can also be used to store the cells of the HDF.

The tree 300 includes a single top-level root cell 301 representing the bounding box (cell) 100 of FIG. 1. All cells except for the root node have a parent cell and each cell is either a leaf cell (e.g., 303) or it has four (or eight) child cells (e.g. cell 302 has a parent cell 301 and child cells 304). As indicated, a particular cell can be labeled as an exterior cell 311, an interior cell 312, or a surface cell 313. In the figure, unfilled cells indicate exterior cells, solid-filled cells indicate interior cells, and barred cells indicate surface cells. The exterior cells represent cells that lie completely outside the object 101 of FIG. 1. Interior cells represent cells that lie entirely inside the object. Surface cells 313 contain a portion of the object surface, where the distance field includes a value of zero.

In accordance with the invention, associated with each cell is a method for reconstructing the part of the distance field within the cell from a small number of sampled distance values associated with the cell. The reconstructed distance field can be used to reconstruct the object surface, distances to the object surface, the direction to the object surface and other properties related to the object associated with the distance field.

The representation of FIGS. 2 and 3 differ from the prior art in two important areas.

First, prior art in spatial data structures do not store distance fields values. Instead, known three-color trees just indicate which nodes are surface nodes and which nodes are interior or exterior nodes. Surfaces are rendered by simply drawing the pixels that correspond to surface nodes. As a result, the resolution of the image is only as good as the resolution of the grid from which the tree was derived. With hierarchical distance fields according to the invention, the continuous distance field within each cell can be reconstructed from the cell's distance values and reconstruction method. For rendering or manipulating surfaces, this provides a more accurate reconstruction of surfaces even when the resolution of the surface cell is relatively low.

Second, the size of each cell is detail directed. Unlike known distance maps where all cells have the same resolution, or known three-color trees where surface nodes all lie at the highest resolution level of the tree, the size of a surface cell in hierarchical distance fields is determined by the detail in the distance field enclosed by the cell. Low-resolution (large) cells can be used to represent smoothly varying fields near smooth surfaces while arbitrarily high-resolution (small) cells can be used to represent the distance field near surface detail such as corners or high curvature surfaces. This feature of the invention significantly reduces memory storage and access requirements over traditional distance maps.

Hierarchical Distance Fields Data Structures

Figure 4:
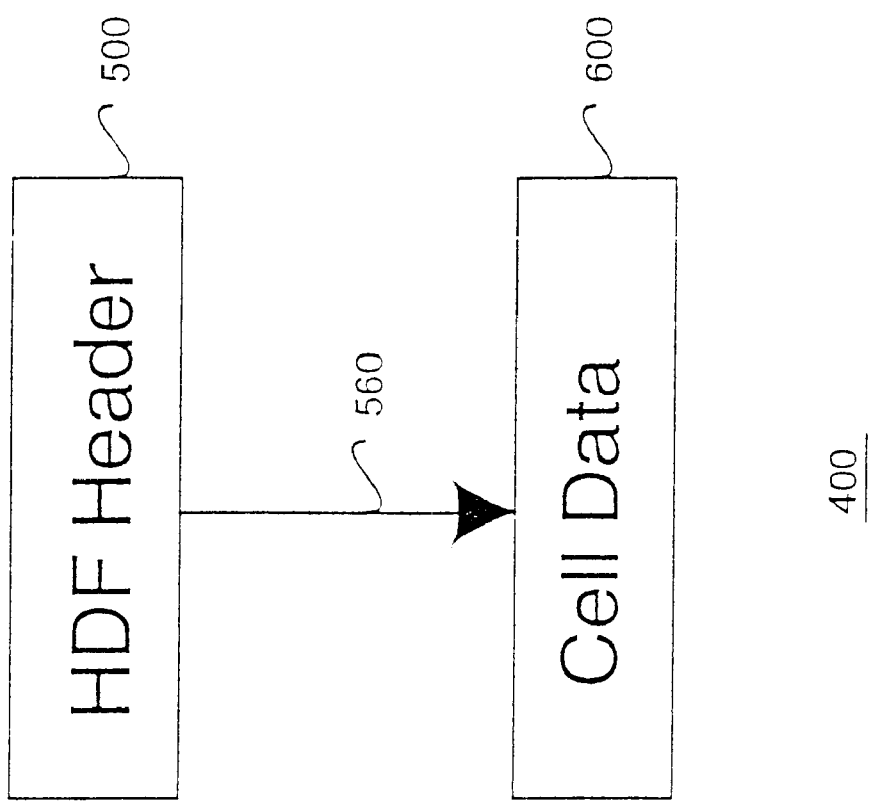
FIG. 4 is a block diagram of a header and cell data of the HDF.

FIG. 4 shows a hierarchical distance field (HDF) 400. The HDF 400 includes an HDF header 500 and cell data 600. As stated above, a cell is a bounded, connected region of the domain of the HDF. As an example, a regular, orthogonal grid can partition the domain of the HDF into a set of rectangular cells with each cell having a size corresponding to detail of the distance field and a location with respect to the bounding box.

HDF Header

Figure 5:
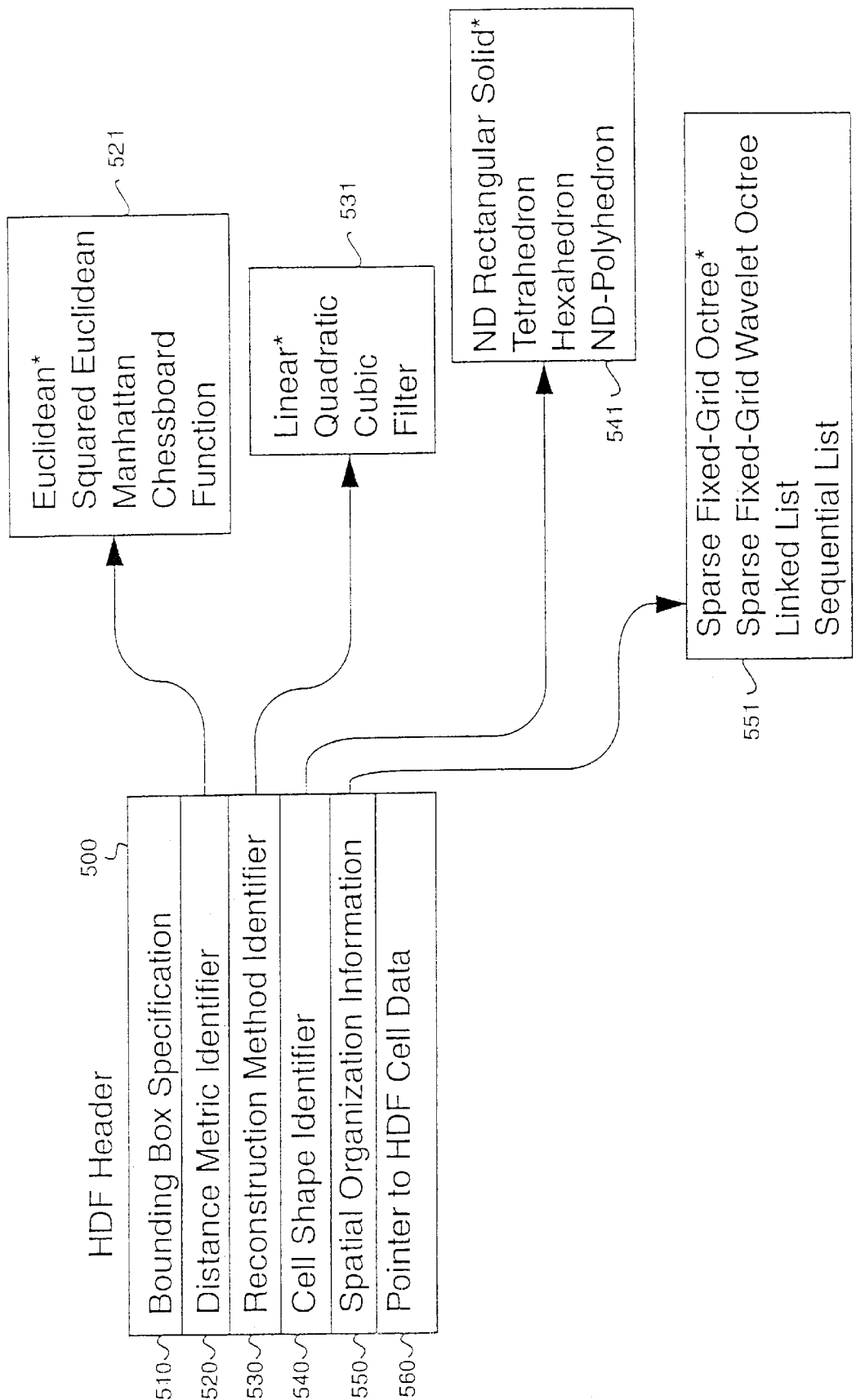
FIG. 5 is a block diagram of the HDF header.

As shown in FIG. 5, the HDF header 500 can include a bounding box specification 510 defining the bounding box 100 of the HDF, a distance metric identifier 520, a reconstruction method identifier 530, a cell shape identifier 540, spatial organization information 550, and a pointer 560 to the cell data 600.

The distance metric specified by the distance metric identifier 520 can be one of the following 521: Euclidean distance, squared Euclidean distance, Manhattan distance, chessboard distance, or an arbitrary single-valued N-dimensional function with the properties discussed for distance fields above.

The reconstruction method specified by the reconstruction method identifier 530 can be one of the following 531: linear, bilinear, trilinear, quadratic, biquadratic, triquadratic, cubic, bicubic, tricubic, or an arbitrary reconstruction filter such as a weighted sum of sample values from the sampled distance field.

The cell shape specified by the cell shape identifier 540 can be one of the following 541: an N-dimensional rectangular solid, a tetrahedron, a hexahedron, an N-dimensional polyhedron, or a sphere, to name but a few possible shapes.

The spatial organization information 550 defines the spatial partitioning used to represent the HDF, the hierarchical structure used to represent that partitioning, and the location of the HDF. Instances 551 of spatial organizations include a sparse fixed-grid quadtree or octree, a sparse fixed-grid wavelet structure quadtree or octree, a linked cell list, or a sequential cell list.

The pointer to the HDF cell data 560 can be a pointer to the root cell 301 of a sparse fixed-grid tree 300. The preferred form of the various fields is marked with an asterisk "*".

Tree Cell Data

Figure 6:
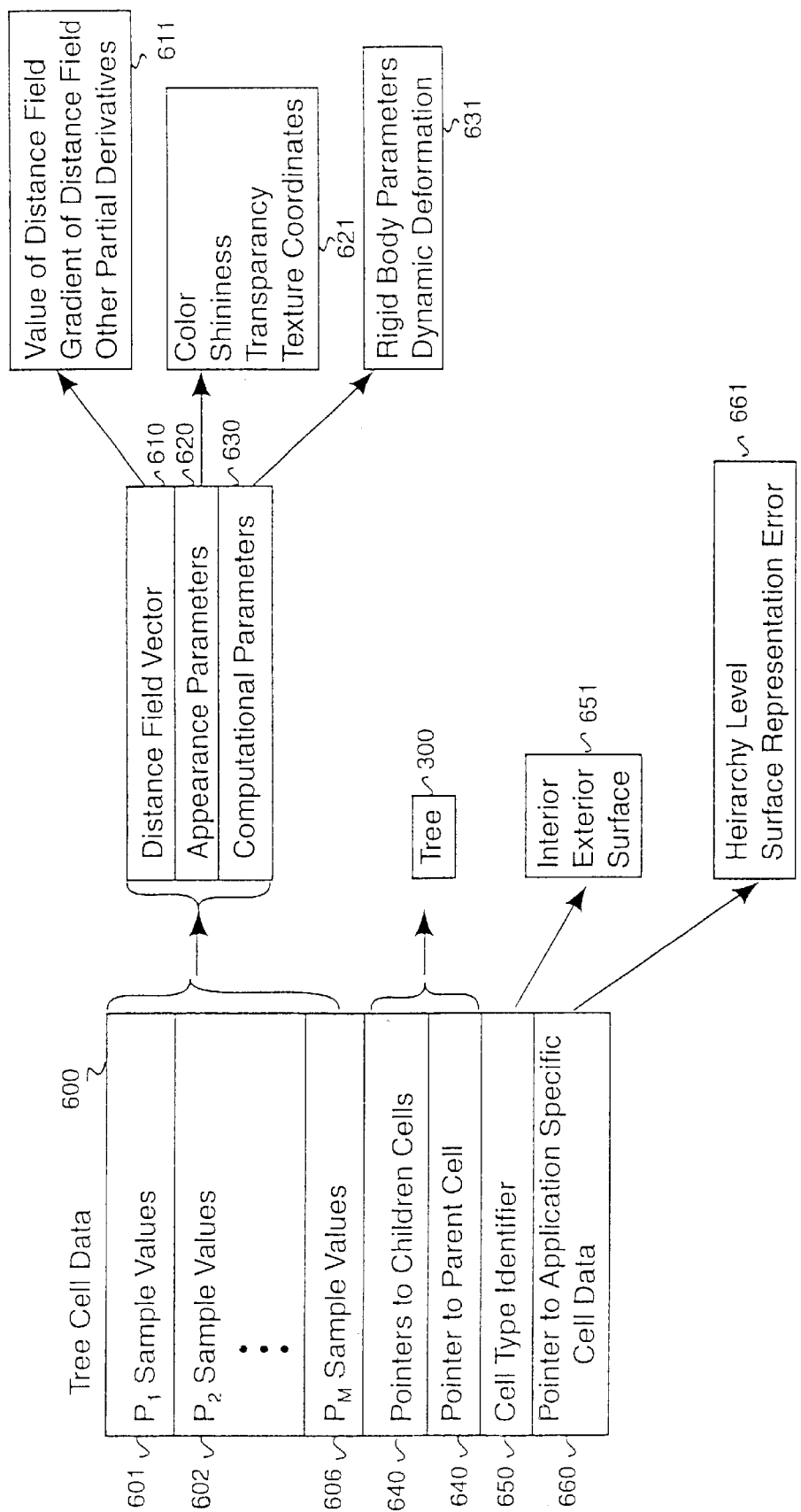
FIG. 6 is a block diagram of the cell data.

As shown in FIG. 6, cell data 600 can include sampled values 601–606 for M sample points, $P_1, P_2 \ldots P_M$, associated with a cell. The sample values for each sample point can include attributes such as a distance field vector 610, appearance parameters 620, and computational parameters 630. In addition, the cell data 600 can include pointers 640 of the tree 300 such as pointers to the cell's children cells, and a pointer to the cell's parent cell. Other cell data include a cell type identifier 650, and a pointer 660 to application specific cell data 661 such as the cell's level in the hierarchy or the cell's surface representation error.

The distance field vector 610 can include the value of the distance field, a gradient of the distance field, and other partial derivatives of the distance field 611. Appearance parameters 620 can include values 621 such as the color, shininess, transparency, or texture coordinates at a given sample point. Computational parameters 630 can include values 631 used during physical modeling such as physical properties like mass, position, orientation, angular velocity, mass, elasticity, or Young's modulus. Physical modeling can include rigid body mechanics and dynamic deformation.

The cell type specified by the cell type identifier 650 can be one of the following 651: interior (a cell that lies entirely within the surface of the object 101), exterior (a cell that lies entirely outside), and surface (a cell that is intersected by the surface of the object 101).

Wavelet Tree

A wavelet sparse fixed-grid tree can include the bounding box 100 defining the location of the HDF, a pointer to the root node, and a wavelet basis identifier. The wavelet basis specified by the wavelet basis identifier can be one of the following: the Haar basis, the Daubechies basis, or any other arbitrary wavelet basis function. The cell data for this type of tree is the same as shown in FIG. 6, except that distance field vector 610 is expressed as wavelet distance detail coefficients.

Linked List

Alternatively the HDF data structure can be organized as a linked list. In this case, the structure includes a bounding box 100 defining the location of the HDF, and a pointer to the linked list. Also, in this representation, the pointers 640 of the cell data 600 can include pointers to the next cell in the list and the previous cell in the list.

Data Structure Extensions

As an extension to the preferred data structure, an HDF can contain the reconstruction method identifier 530. The identifier can be specified on a per cell basis. If a cell also specifies a reconstruction method identifier, then the cell's method will override the method 530 specified in the HDF header 500. This per-cell reconstruction method identifier can specify a reconstruction method that specifically applies to the surface detail represented by the distance field within that cell. For example, the reconstruction methods used in the vicinity of flat surfaces can be different than methods used near a highly curved surface or a corner. Reconstruction methods can be specialized to surface features within the cell such as sharp corners, rounded corners, or spikes, or to generate particular appearances such as bumps, scratches, grooves, or ridges on the surface.

Memory Lay-out

Figure 7:
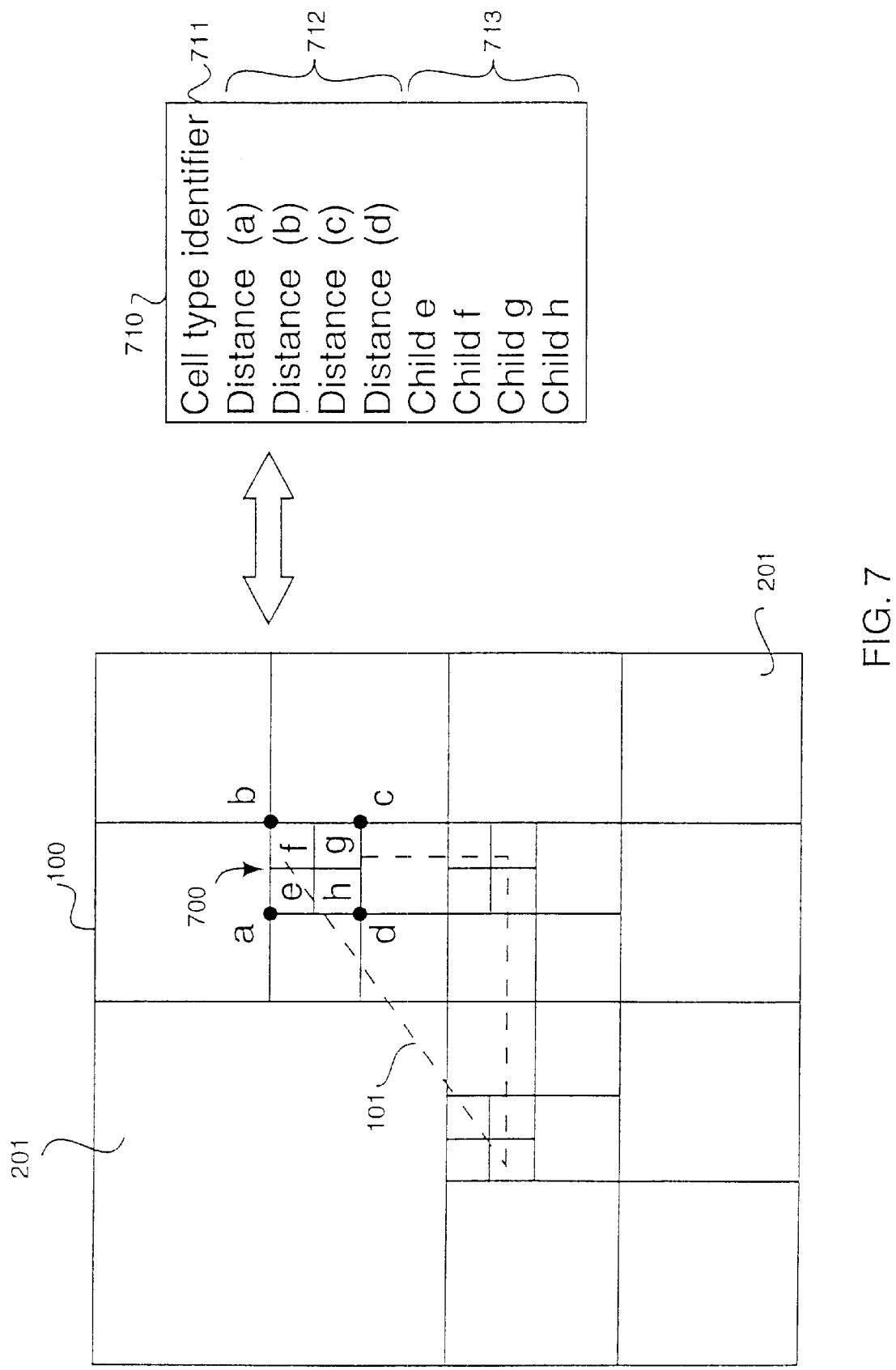
FIG. 7 is a block diagram linking a HDF cell and cell data.

FIG. 7 shows the relationship between the spatial partition of the HDF within bounding box 100, and a data structure 710 stored in a memory. The HDF includes a cell 700 with vertices a, b, c, and d. Further, the cell is partitioned into detail directed child cells e, f, g, and h. The data structure 710 includes a cell type identifier 711, sampled distance values 712 at sample points a, b, c, and d, and pointers 713 to child cells e, f, g, and h.

Figure 8:
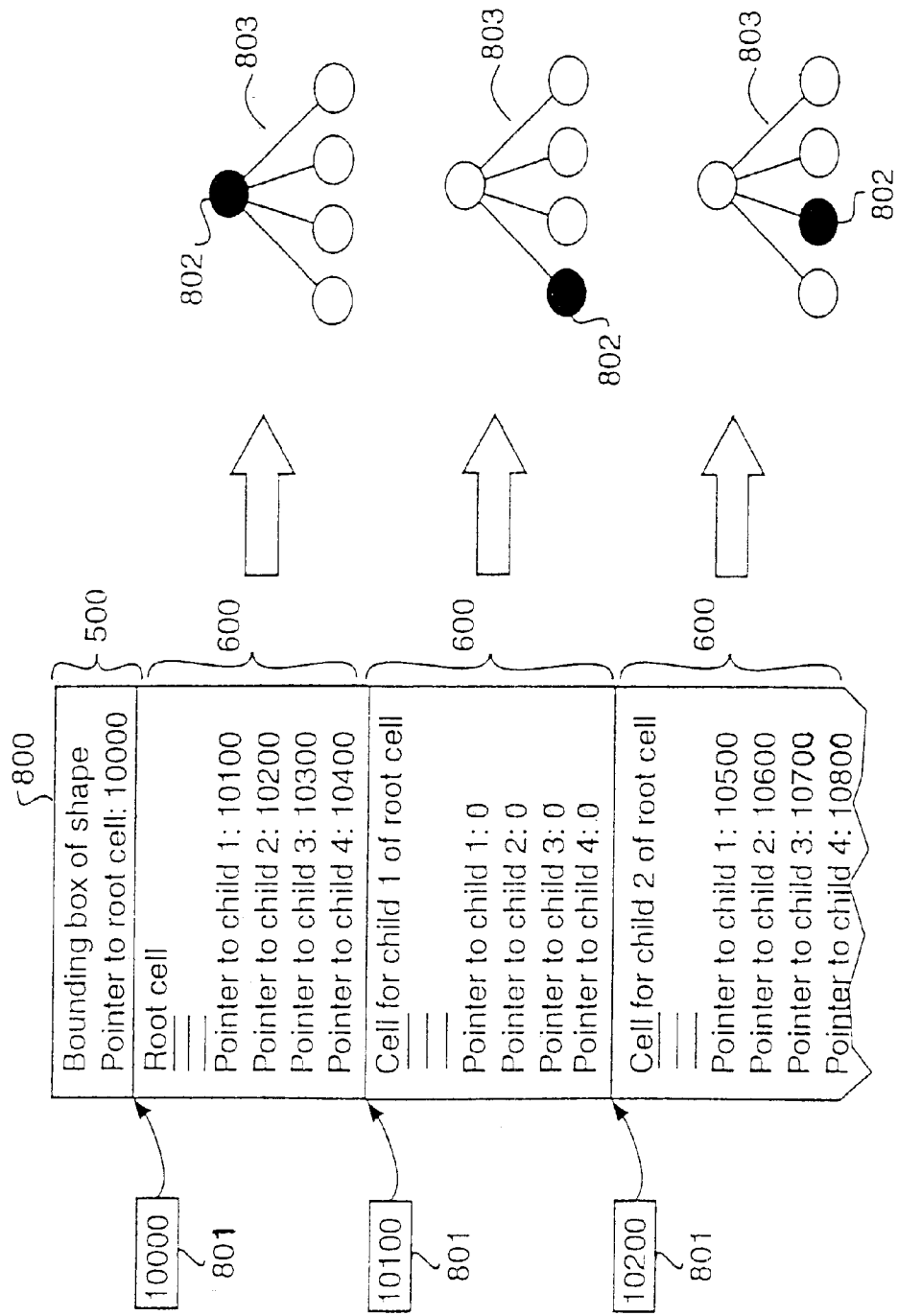
FIG. 8 is a block diagram of a memory storing the HDF.

FIG. 8 shows a possible memory layout 800 for an HDF in quadtree form with the root cell 301 and its cell data 600, and child cells with their cell data. Boxes labeled 801 represent memory addresses. In FIG. 8, the solid-filled cells 802 in the subtrees 803 show the relationship between the memory data structure and the HDF of FIG. 3.

Figure 9:
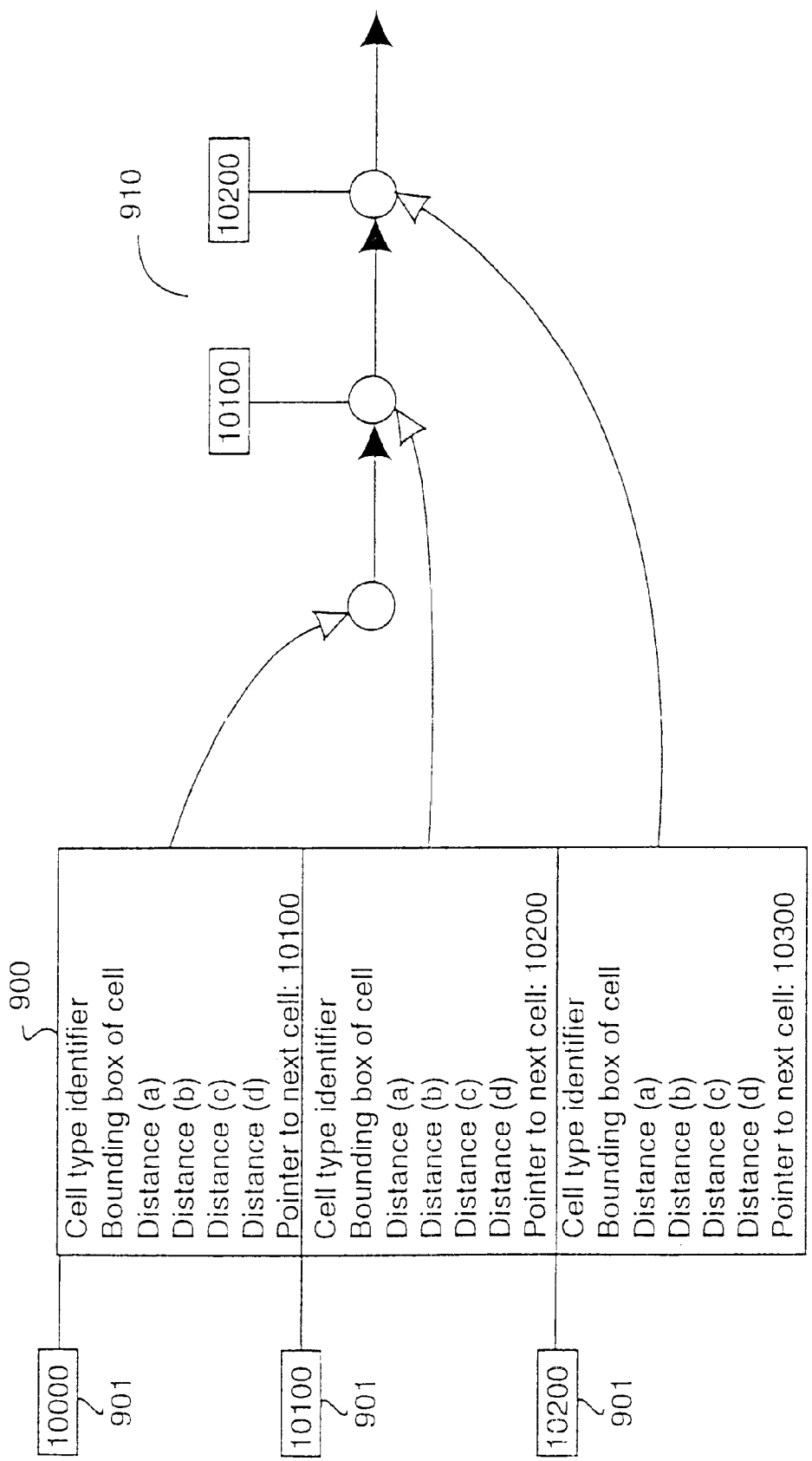
FIG. 9 is a block diagram of a memory storing the HDF as a linked list.

FIG. 9 shows a possible memory layout 900 for an HDF in a linked list form 910. Boxes labeled 901 represent memory addresses.

Fundamental Methods

This section and FIG. 10 describe fundamental methods that can be performed on the hierarchical distance fields according to the invention. The following notation is used. For each method, the boldface word is the name of the method 1010 followed by the method's arguments in parenthesis 1020, followed by the data type 1030 that is returned by the method. A method designated with "*" refers to a pointer to the named variable. Data types include the following:

Point—a (e.g., x,y,z) location in the world coordinate system;

Vector—a (e.g., 3D) vector;

Boolean—a TRUE or FALSE value;

HDF—the hierarchical distance field data structure; and

Cell—a cell of the HDF data structure as defined above.

Float—a floating point value

Integer—an integer value

BitVector—a vector of single-bit on/off state variables

Matrix—a (e.g., 4×4) matrix of floating point values

ObjDistAndParamFunction—a function for calculating, at a point, the closest distance to an object surface and the appearance and computational parameters for that object Methods for Querying and Locating a Point in the HDF (1001)

PointInHDF

Return the Boolean TRUE if the point p is in the bounding box of the HDF, and FALSE otherwise.

PointInHDFCell

Traverse the HDF tree from the root cell to the leaf cell that contains p using either the implicit spatial extent of the cell from the HDF hierarchy, or the computed spatial extent from the HDF hierarchy and the cell's data, and return the HDF leaf cell containing p.

PointInHDFCellAtSomeFixedLevel

Return the HDF cell containing p that is at the given level or at a lower resolution level when the cell has no children. Traverse the tree from the root cell towards the leaf cell containing p, checking the cell level against the given level. Return the first encountered of the leaf cell and the cell at the given level.

PointInHDFCellAtFixedErrorTolerance

Return the HDF cell containing p whose surface representation error 661 is less than the given error tolerance. Traverse the tree from the root cell towards the leaf cell containing p, checking the cell surface representation error against the given error tolerance. Return the first cell whose surface reprensentation error is less than the given error tolerance.

Method for Changing Content of HDF Cell

To change the content of a cell in the HDF, any of the above query methods which determines the cell that contains a point, p, can be followed by directly assigning new content to any of the elements of the cell shown in FIGS. 5 and 6.

Methods for Reconstructing and Interpolating Distances and Parameters (1002)

DistanceToSurfaceInSurfaceCell

Computes the distance field value at a point p within the given surface cell using the reconstruction method of the HDF or the cell.

DistanceToSurfaceInNonSurfaceCell

Check the surface representation error in a non-surface cell against the given error tolerance. If the surface representation error is less than the given error tolerance, then use DistanceToSurfaceInSurfaceCell to compute the distance field value. If the surface representation error is larger than the given error tolerance, then find the closest surface point using the LocateClosestPointOnSurface method (below) and compute the distance from p to that point.

PointInsideObject

If the cell is a surface cell, then compute the distance value at p using DistanceToSurfaceInSurfaceCell. Use the sign of the computed distance as an inside/outside test. If the cell is a non-surface cell, use the cell type (interior or exterior) to determine if p is inside or outside of the surface. Return TRUE if p is inside the object, and FALSE otherwise.

ReconstructAppearanceParams

Reconstructs the appearance parameters at p within the given cell using the reconstruction method of the HDF or the cell.

ReconstructComputationalParams

Reconstructs the computational parameters at p within the given cell using the reconstruction method of the HDF or the cell.

ComputeHDFGradient

Computes the gradient of the distance field at p using the reconstruction method of the HDF or the cell. For example, using a trilinear reconstruction method and a central differences gradient filter, the gradient, (dx, dy, dz), at a point (x,y,z) within a rectangular solid cell with a bounding box defined by the corner vertices (0,0,0) and (1,1,1) can be computed from the sampled distance values from the 8 corner vertices as:

$$dx=(d_{100}-d_{000})(1-y)(1-z)+(d_{110}-d_{010})y(1-z)+(d_{111}-d_{011})yz+(d_{101}-d_{001})(1-y)z$$

$$dy=(d_{010}-d_{000})(1-x)(1-z)+(d_{110}-d_{100})x(1-z)+(d_{111}-d_{101})xz+(d_{011}-d_{001})(1-x)z$$

$$dz=(d_{001}-d_{000})(1-x)(1-y)+(d_{101}-d_{100})x(1-y)+(d_{111}-d_{110})xy+(d_{011}-d_{010})(1-x)y$$

where $d_{ijk}$ is the sampled distance at vertex (i,j,k).

ComputeHDFPartialDerivatives

Computes the partial derivatives of the distance field specified by a bitVector "whichPartials" using the reconstruction method of the HDF or the cell. All possible or desirable partial derivatives and/or mixed partial derivative computations are enumerated so that each bit in the which-Partials BitVector specifies whether or not to compute the associated partial derivative.

Method for Finding the Closest Point on the Object Surface (1003)

LocateClosestPointOnSurface

This method uses the distance value and gradient of the distance field to search for the closest surface point. The method returns the location of the closest surface point. In one approach, a ray is cast from the point p in the direction of the gradient to determine the location where the ray intersects the surface. This approach works well when the surface representation error in the cell containing p is sufficiently small. When this approach fails to satisfy the position error tolerance, epsPositionError, an alternative approach uses the given surface-ray intersection point as a starting point in a constrained optimization algorithm. This optimization method minimizes the distance between p and a candidate position q, where q is constrained to lie on the surface. To eliminate the need for the constrained optimization approach, the HDF is generated such that the surface representation error is sufficiently small for all cells that might be querried by this method, e.g., the exterior and surface cells.

Methods for Partitioning, Combining, and Truncating HDFs (1004)

PointBasedPartitionPredicate

Compute a set {D1} of distance and parameter values at test points using the ObjDistAndParamFunction given as input. Compute the set {D2} of distance and parameter values at the test points using the HDF's or the cell's reconstruction method and the cell's data. If differences between the sets {D1} and {D2} are all less than the error tolerances epsDist and epsParams, return TRUE, indicating that the cell does not need to be partitioned.

CellBasedPartitionPredicate

Choose a set of prediction points and a set of validation points from the sample points of the cell. The union of the prediction and validation points should be all of the sample points of the cell and the intersection of these two sets of points should be the NULL set. Choose a reconstruction method, R, of lower order than the cell's reconstruction method. Compute a set {D} of distance and parameter values at the locations of the validation points using method R applied to the prediction points. If differences between the set {D} and the actual distance and parameter values at the validation vertices are all less than the error tolerances epsDist and epsParams, then return TRUE, indicating that the cell does not need to be partitioned.

GradientBasedPartitionPredicate

Compute a set {G1} of gradients of the distance field at test points using the ObjDistAndParamFunction given as input. Compute the set {G2} of gradients of the distance field at the test points using the HDF's or the cell's ComputeHDFGradient method and the cell's data. If differences between the sets {G1} and {G2} are all less than the error tolerances epsGradient, return TRUE, indicating that the cell does does not need to be partitioned.

FeatureBasedPartitionPredicate

Compute the size of the cell. Compare this size to the size of the smallest feature of the distance field within that cell. If the cell does not contain a feature smaller than the size of the cell, return TRUE, indicating that the cell does not need to be partitioned.

Partition Cell

Generate and initialize children of the parent cell and add their pointers to the parent cell. ps CombinePredicate If all children of the parent cell are interior cells and the surface representation error and the predicted reconstruction errors in the parameter values for the parent cell are less than the error tolerances epsDist and epsParams, then set the parent cell type to interior and return TRUE. Else, if all children of the parent cell are exterior cells and the surface representation error and the predicted reconstruction errors in the parameter values for the parent cell are less than the error tolerances epsDist and epsParams, then set the parent cell type to exterior and return TRUE. Else, if some of the parent cell's children are interior and some are exterior, and the surface representation error and the predicted reconstruction errors in the parameter values for the parent cell are less than the error tolerances epsDist and epsParams, then set the parent cell type to surface and return TRUE.

CombineCell

Modify a parent cell with any necessary data from its children cells, and then remove the children cells of the parent cell.

BuildLevelOfDetailHDF

Returns a truncated version of the given HDF. In the truncated version of the HDF, branches of the tree below cells that satisfy the given error tolerences are truncated.

BuildLevelOfDetailSurfaceCellList

Returns a list of leaf node cells from an HDF truncated according to the given error tolerences.

BuildMaxLevelHDF

Returns a truncated version of the given HDF where branches of the tree of higher resolution than the given maximum level are truncated.

BuildMaxLevelSurfaceCellList

Returns a list of leaf node cells from an HDF truncated at the given maximum level.

BuildViewDependentHDF

This method returns an HDF that has been truncated to satisfy view dependent error tolerances. Each cell's tolerences may be different and will depend on how far the cell is from the viewer, the perspective projection, etc. While traversing the HDF from the top down, for each cell, the viewing parameters, e.g. eyePosition and ObjToSampleSpaceTransform, and the cell's surface representation errors and prediected reconstruction errors in appearance parameters are used to compute the maximum sample space error, the maximum normal error, and the maximum errors for the appearance parameters. Branches of the HDF tree below cells where these predicted maximum errors are less than the corresponding error tolerances, e.g. epsSampleSpaceError; epsNormal, and epsParams, are truncated.

Methods for Rendering (1005)

IsSurfaceCellBackFacing

Use the sampled distance values at sample points of the surface cell and the reconstruction methods to determine whether all of the surface within the surface cell faces away from the ray direction. The method returns TRUE when all of the surface within the surface cell faces away from the rayDirection. This information can be used for backface culling to reduce the rendering load. For example, if the surface in the cell is sufficiently planar, as determined by some combination of the sampled distance values, the reconstruction method, and the cell's surface representation error, then whether or not the surface in the cell is backfacing can be determined by computing the dot product of the gradient at the center of the cell with the ray direction. If the surface in the cell is not sufficiently planar, then the cell can be subdivided and this method can be applied recursively.

Generating Hierarchical Distance Fields

The next two sections describe how an HDF can be generated using the fundamental methods described above. An HDF can be generated in either a top-down or a bottom-up manner. Typically, the top-down order can be used when the HDF is generated from a parametric form or an implicit representation of the object's surface, and the bottom-up order can be used when the HDF is generated from an image or a distance map.

A top-down generation can be summarized as follows. The space within the bounding box 100 is recursively partitioned into equal sized cells, for example, quadrants in 2D, octants in 3D, etc. At each level of partitioning, a test is made to determine whether a surface of the object 101 intersects a particular cell. If not, the cell is labeled as either an exterior or interior cell. Otherwise, another test is made to determine whether a predetermined level of resolution has been reached or whether the surface reconstructed from the cell's sample values using the cell's reconstruction method is within an error tolerance, of the true surface. If not, the partitioning is iterated, otherwise the cell is labeled as a surface cell.

A bottom-up generation starts by recursively partitioning the space within the bounding box into equal sized cells until a predetermined level of resolution is reached. The cells are appropriately labeled interior, exterior, or surface cells. Next, grouped of neighboring cells are recursively combined when the surface representation error of the combined cell is less than a specified error tolerance. The specified error tolerance can be different depending on the application and whether the combined cell is an exterior, interior, or surface cell. When adjacent cells cannot be combined, the cells remain as leaf cells in the tree.

Top-Down
Initialization

Figure 11:
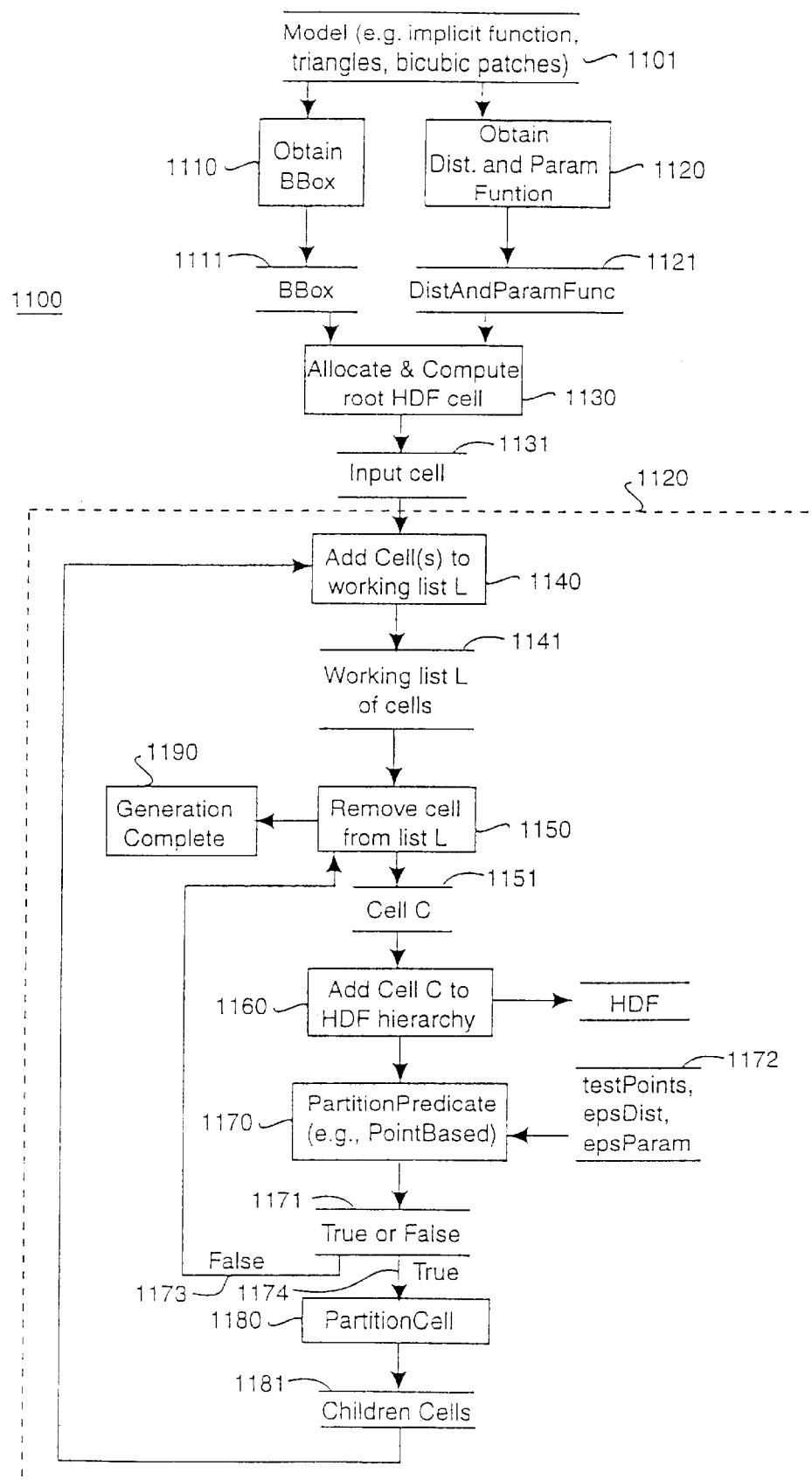
FIG. 11 is a flow diagram of a top-down method for generating the HDF.

FIG. 11 shows a method 1100 for generating an HDF according to the invention in a top-down order. The input to the method 1100 is an object description or model 1101. For example, the model can be an implicit function, polygons, bicubic patches, and the like. In step 1110, a bounding box (BBox) 1111 is obtained. The bounding box can be computed from the model, or the bounding box can be explicitly stored with the model. In step 1120, a distance and parameter function DistAndParamFunc 1121 is obtained. This function is used during HDF generation to determine distances to the surface of the object or model, appearance parameters, and computational parameters. Step 1130 allocates and computes a root cell 1131 for the HDF using the bounding box and the distance and parameter function. The root cell 1131 is the input for the main loop 1120 of the generating method 1100.

Main Loop

The main loop 1120 for the top-down generation method 1100 can be called by other methods for any input cell as described below. For example, a method for applying an editing tool to the HDF can call the main loop 1120 after some part of the distance field has been edited by a tool.

Step 1140 adds the input cell 1131 to a working list L 1141. Step 1150 removes a current cell C 1151 from the working list L. If the list is empty, generation completes in step 1190. Step 1160 adds the cell C to the HDF structure.

Step 1170 tests the cell C to determine whether or not it should be partitioned. Generally, the test is based on a partition predicate that determines whether the cell's sample values specify the object surface, appearance or computation parameters, i.e., detail, within specified error tolerances, epsDist and epsParams, 1172. Some examples of partition predicates are described with FIG. 10 under fundamental methods for partitioning, combining, and truncating HDFs (1004) as PointBasedPartitionPredicate and CellBasedPartitionPredicate. These partition predicates compare predicted values with stored or calculated distance and parameter values at test points in the cell. These partition predicates require the specification of test points, distance error tolerances (epsDist), and parameter error tolerances (epsParam) 1172 as input.

The test 1170 evaluates as true or false 1171. If the test is false 1173, then the cell C 1151 is sufficiently partitioned and the process is continued by removing the next cell in the working list L at step 1150. Otherwise, if the test is true 1174, then the cell C 1151 is partitioned at step 1180 to produce children cells 1181, and the process is continued at step 1140 by adding the children cells to the working list L for further processing by the main loop 1120.

As an advantage of this generating method, distance information can be calculated only where needed, saving memory and computation, and the HDF can be subdivided to arbitrary depth where reconstruction of the distance field requires higher sampling rates, providing arbitrary, detail-directed precision in the representation of the distance field.

Bottom-Up
Generating A Fully Populated HDF

Figure 12:
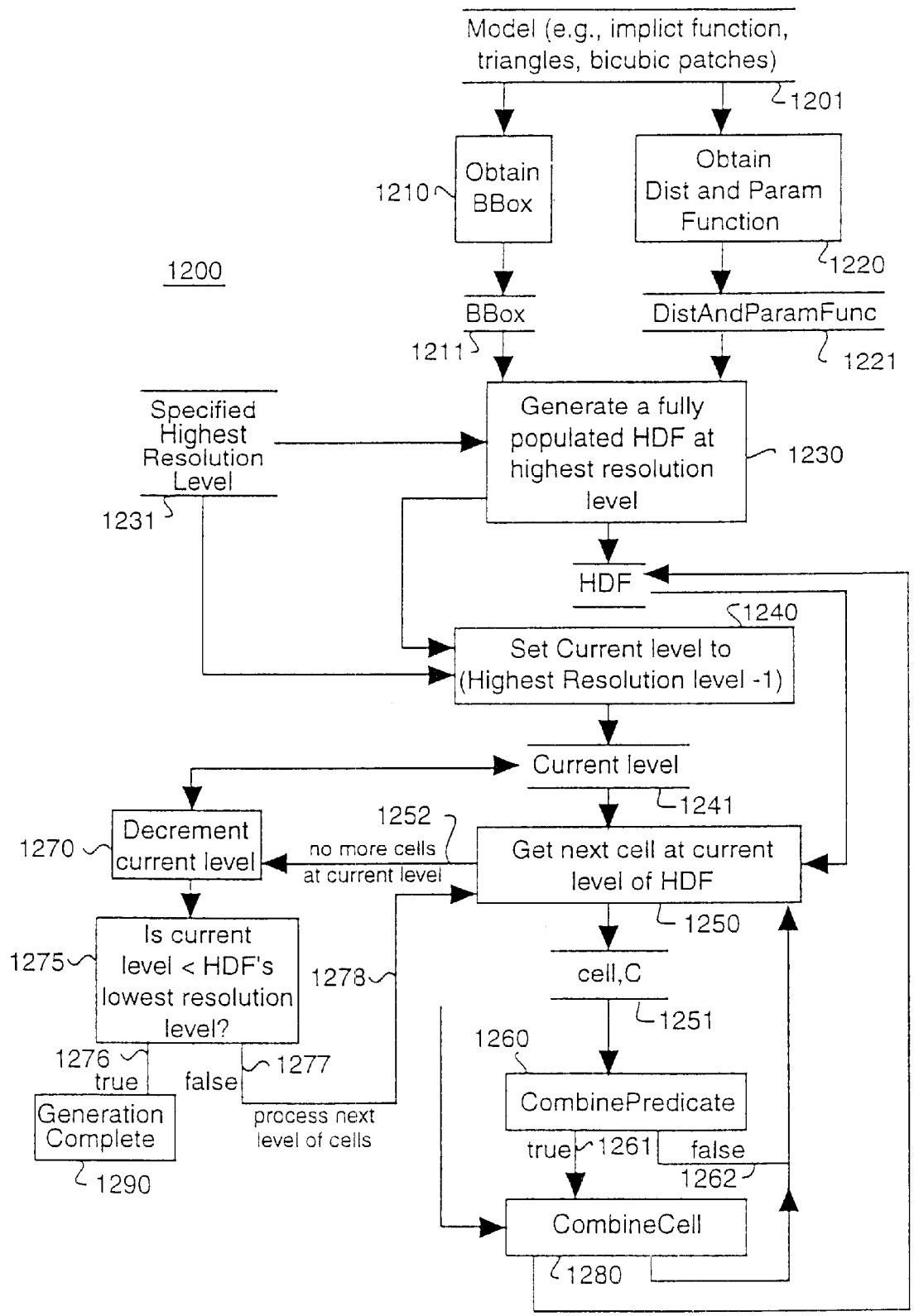
FIG. 12 is a flow diagram of a bottom-up method for generating the HDF.

FIG. 12 shows a method 1200 for generating an HDF according to the invention from the bottom-up. As with the top-down method, the input to the method 1200 is an object description or model 1201. For example, the model can be an implicit function, polygons, bicubic patches, and the like. Alternatively, the object description can be an image. In step 1210, a bounding box for the object (BBox) 1211 is obtained. The bounding box can be computed from the model, or the bounding box can be explicitly stored with the model. In step 1220, a distance and parameter function DistAndParamFunc 1221 is obtained. This function is used during HDF generation to determine distances to the surface of the object or model, appearance parameters, and computational parameters.

In step 1230 the bounding box 1211 and the distance and parameter function are used to construct a fully populated HDF at a user-specified highest resolution level 1231. This highest resolution level limits the depth of the tree structure and if the input object description is an image, then the highest resolution can be selected as the resolution of the input image. To fully populate the HDF, the bounding box is recursively partitioned until all of the leaf cells of the HDF are at the specified highest resolution level. The data in the cells is as described for FIGS. 5 and 6.

Combining Cells in the Fully Populated HDF

After the fully populated HDF has been generated, the children of cells at a particular resolution level can be combined wherever possible. This can be done in a bottom-up order as follows.

In step 1240, a current resolution level 1241 is set to one level lower than the specified highest resolution level 1231.

In step 1250, a cell C 1251 at the current level is selected from the HDF. Step 1260 applies the CombinePredicate method described above to the children of the cell C to test whether or not the children cells can be combined. This test is evaluated as true 1261 or false 1262.

If false, then the children of the cell C are not combined and the next cell at the current level is selected. If there are no more cells to select at the current level 1252, then the current level 1241 is decremented to the next lower resolution level in step 1270. The decremented level is tested to determine whether or not it is the root level of the tree in step 1275. If true 1276, then the generation of the HDF completes in step 1290. Otherwise, if false 1277, then the decremented level becomes the current level and cells at this level are processed 1278.

If the CombinePredicate method evaluates to true 1261 in step 1260, then the children of cell C are combined into C using the CombineCell method in step 1280.

Figure 13:
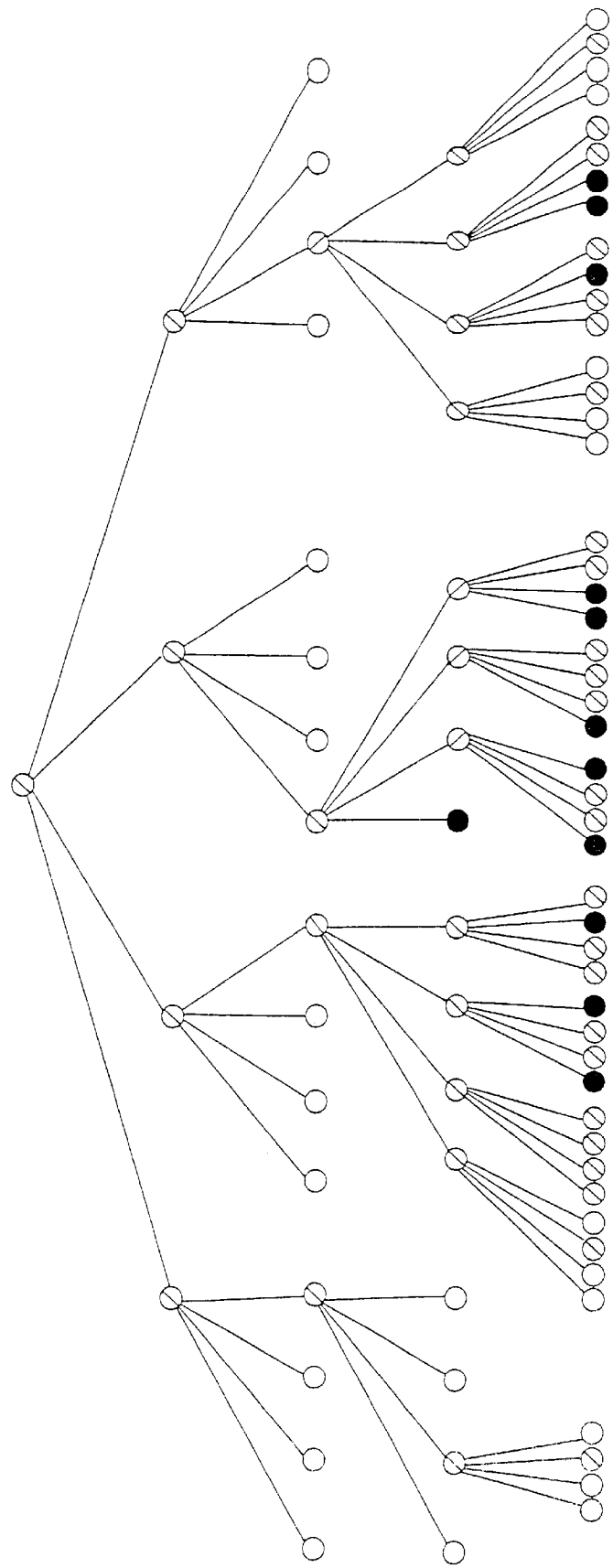
FIG. 13 is a graph of a fully populated HDF.
Figure 14:
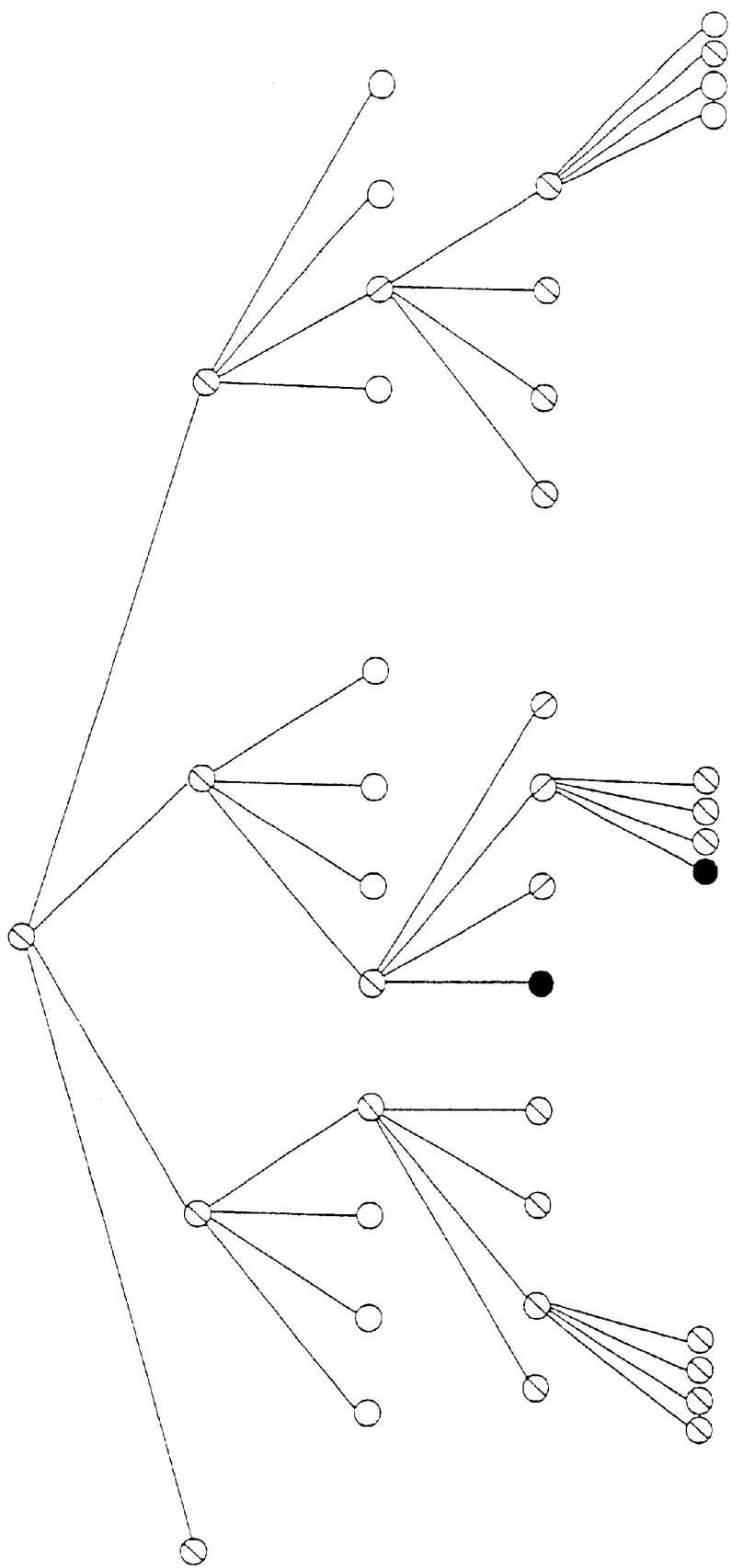
FIG. 14 is a graph of the HDF after combining.

FIGS. 13 and 14 respectively show a tree representing an HDF for a 2D object before and after combining. As in FIG. 3, unfilled cells indicate exterior cells, solid-filled cells indicate interior cells, and barred cells indicate surface cells.

Figure 15C:
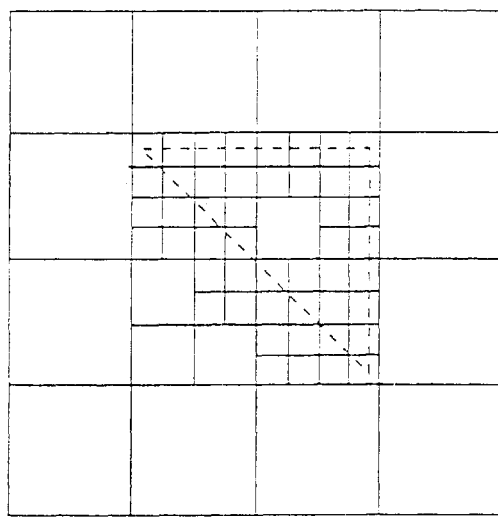
FIGS. 15a–15c are block diagrams of uncombined and combined surface cells.
Figure 15B:
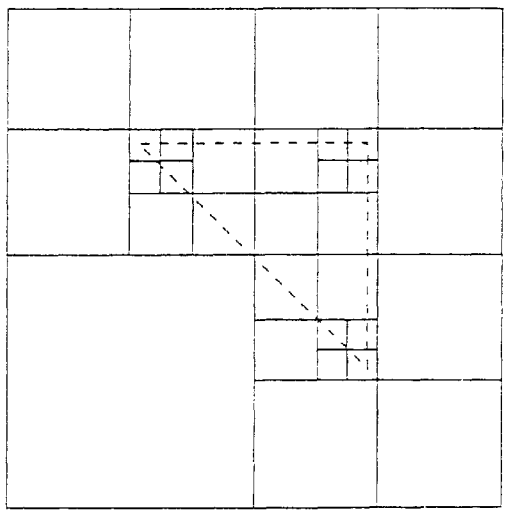
Figure 15A:
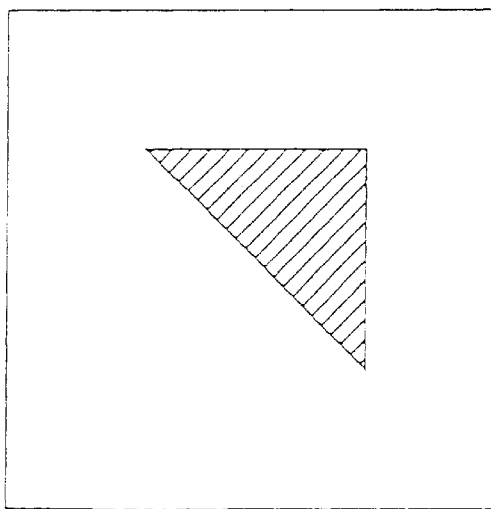

FIGS. 15a, 15b, and 15c respectively show the 2D object that was used to generate the HDF of FIGS. 13 and 14, and the corresponding partitioning of the object's bounding box for the uncombined and combined HDF. It should be apparent from FIGS. 14 and 15c that surface cells that are also leaf cells in the tree structure are not restricted to lie at the highest resolution level of the tree as in the prior art, here leaf cells can lie at any levels.

The bottom-up method is straightforward but requires enough memory to store the fully populated hierarchical distance field, requires generation of the fully populated hierarchical distance field, and the final resolution is limited by the pre-specified highest resolution of the fully populated hierarchical distance field.

Converting HDFs to Standard Surface Representations

The following sections describe four methods for converting HDFs to standard geometric surface representations.

Method for Converting an HDF to a Surface Representation

Figure 16:
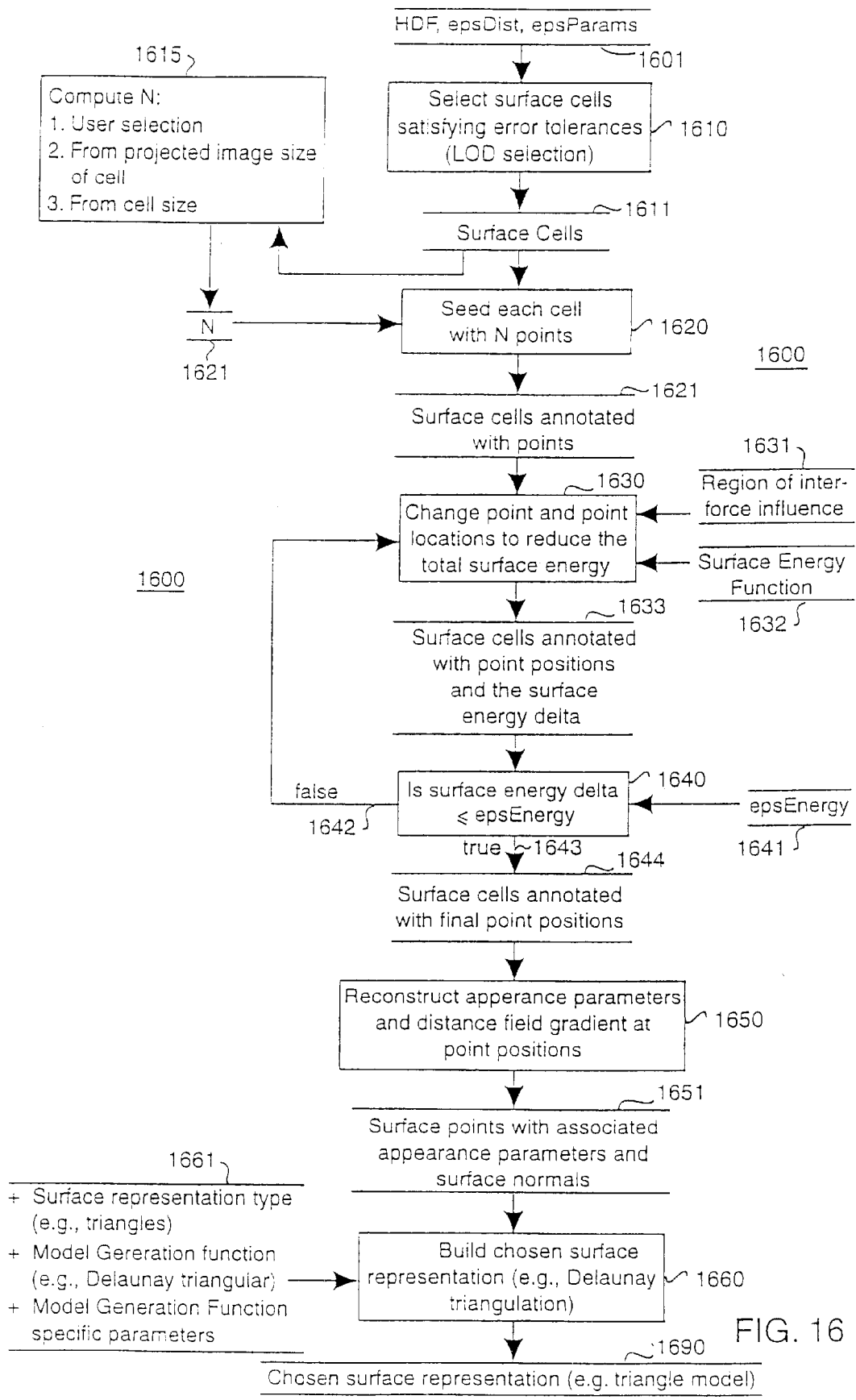
FIG. 16 is a flow diagram of a method for converting the HDF using seeded vertices.

FIG. 16 shows a method 1600 for converting an HDF to a desired surface representation. Desired representations can include polygons (triangles), bicubic patches, point samples, and the like. The input 1601 to the conversion method 1600 is the HDF and error tolerances epsDist and epsParams.

Step 1610 selects surface cells 1611 that satisfy a level of detail (LOD) consitent with the given error tolerances eps-Dist and epsParams. For example these cells can be chosen so that their surface representation errors are less than the given error tolerances. Step 1620 seeds each selected cell with N "points" and annotates the cells with the points 1621. The seed points eventually become vertices of the parametric patches (e.g., triangles) of the desired surface representation. The number of seed points can be selected 1615 by the user, from the size of the cell when projected onto an image, or from the cell size. The initial location of the seed points can be regular or random.

Step 1630 changes the location and number of the seed points to reduce the total surface energy. This means points can be moved, points can be added at locations of high surface detail (e.g. high curvature) and points can be removed from locations of low surface detail (e.g. low curvature). The surface energy is typically a function 1632 of inter-particle spacing and the energy contribution from interacting points is typically non-zero only over a limited region of interforce influence 1631. This region determines how far out the energy function influences neighboring points. The output 1633 of step 1630 is surface cells annotated with new seed point locations and a measure of the change in the surface energy, surface energy delta, that resulted from step 1630.

Step 1640 determines whether or not the surface energy delta is less than or equal to a given threshold change in surface energy, epsEnergy 1641. If false 1642, then continue at step 1630 and change the points until true 1643. If true, the output is surface cells annotated with points at their final positions 1644.

Step 1650 reconstructs the appearance parameters and the distance field gradients at the final point positions using the fundamental methods described above. Given the set of surface points, their locations, appearance parameters and surface normals, the desired surface representation 1690 can be generated in step 1660 from the attributed surface points 1651 using a surface reconstruction method. For example, if the desired surface representation is triangles, the well known Delaunay triangulation method 1661 can be used.

Method for Converting an HDF to Parametric Patches

Figure 17:
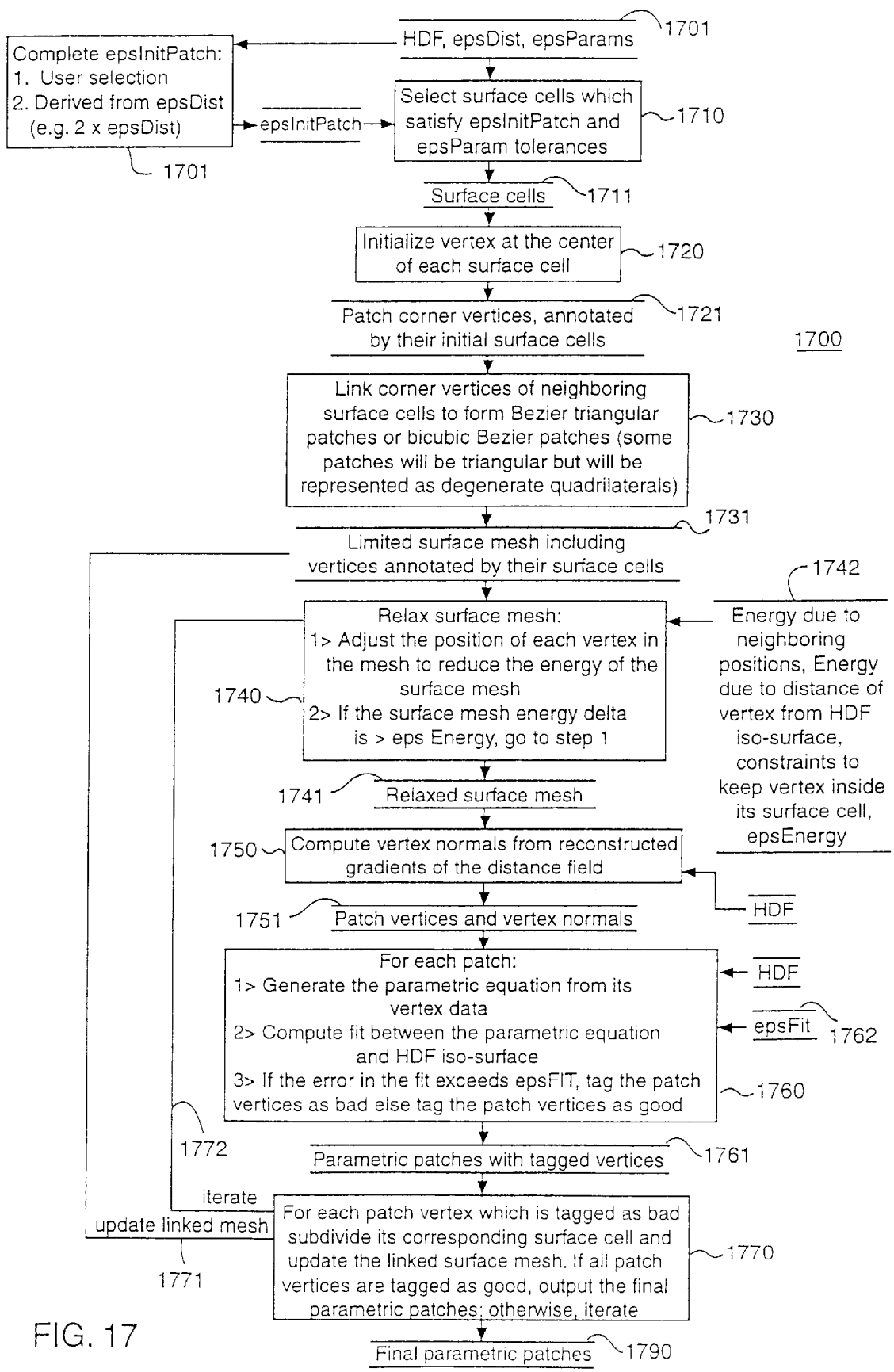
FIG. 17 is a flow diagram of a method for converting the HDF using parametric patches.

FIG. 17 shows a method 1700 for converting an HDF to parametric patches 1790. The input 1701 to the conversion method 1700 is an HDF and error tolerances epsDist and epsParams. Step 1702 sets an error tolerance, epsPatchInit either by user selection or by deriving it from the given distance error tolerance epsDist. The error tolerance, eps-PatchInit is generally less restrictive than epsDist, so that surface cells selected by step 1710 can be of lower resolution level than would have been selected using the given epsDist error tolerance. Because surface patches are subsequently subdivided when error tolerances are not met, this initialization with larger surface patches does not necessarily restrict the accuracy of the final parametric patches but can allow for the possibility of larger patches than would have been generated using epsDist.

Step 1710 selects surface cells 1711 that satisfy a level of detail (LOD) consitent with the error tolerances epsPatchInit and epsParams. Step 1720 initializes a patch corner vertex at the center of each surface cell and annotates each patch corner vertex with its initial surface cell 1721.

Step 1730 links the patch vertices from neighboring surface cells to form Bezier triangular surface patches or bicubic Bezier patches 1731. If bicubic Bezier patches are formed, any triangular patches that are formed can be represented as degenerate quadrilaterals. The output 1731 of 1730 is a linked mesh of parametric patches consisting of vertices annotated with their corresponding initial surface cells and a representation of the links between patch vertices.

Step 1740 produces a relaxed surface mesh 1741 by minimizing a total energy of the mesh 1731 according the energy contribution of neighboring vertex positions, the distance of a vertex from an HDF iso-surface, and constraints to keep the vertices inside the surface cells. After adjusting the positions of each vertex in the surface mesh, the change in the surface energy is compared to epsEnergy 1742. If the surface mesh energy delta is larger than epsEnergy, the position adjustment is repeated. Otherwise, the relaxed surface mesh 1741 is output.

Step 1750 computes vertex normals from reconstructed gradients of the HDF and outputs the patch vertices and their normals 1751.

Step 1760 produces parametric patches from the patch vertices and normals, and tags the vertices as good or bad depending on how well their corresponding patches fit the surface represented by the HDF. For each patch, step 1760 first generates a parametric equation for the patch from the patch vertices and normals 1751. Second, a measure of the fit between the parametric equation and the HDF iso-surface is computed. If the error in the fit between the parametric representation and the HDF iso-surface exceeds a given error tolerance epsFit, the patch does represent the surface well and must be subdivided. In this case, the patch vertices are tagged as bad, otherwise the vertices are tagged as good.

Step 1770 subdivides all surface cells with vertices tagged as bad, updates 1771 the linked surface mesh 1731 and reiterates 1772 at step 1740, until all patch vertices are tagged as good and the final parametric patches 1790 are output.

Method for Converting an HDF Using SurfaceNets

Figure 18:
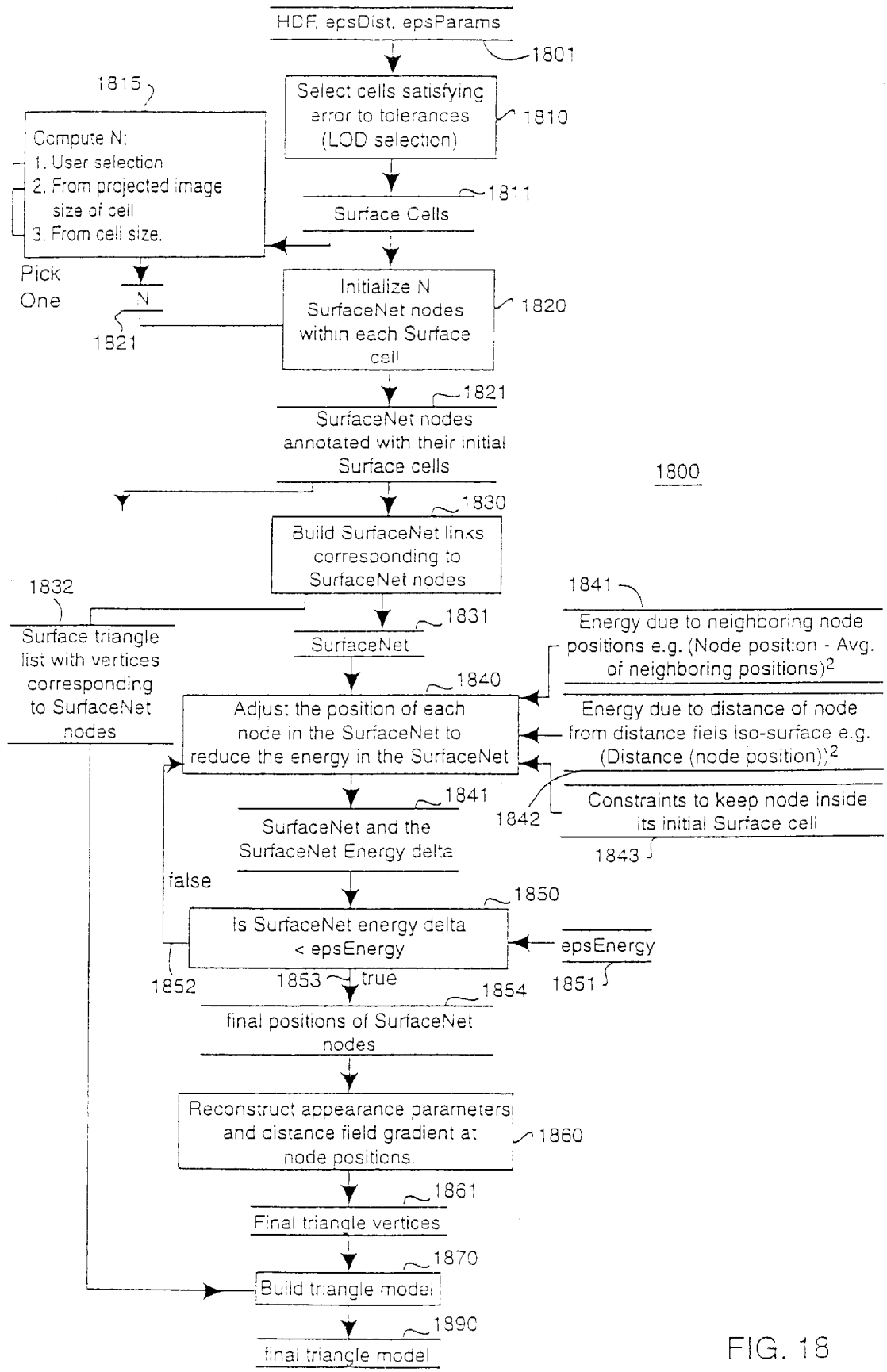
FIG. 18 is a flow diagram of a method for converting the HDF using surface nets.

FIG. 18 shows a method 1800 for converting an HDF into a triangle model using SurfaceNets. The input 1801 to the conversion method 1800 is the HDF, and error tolerances epsDist and epsParams.

Step 1810 selects surface cells 1811 that satisfy a level of detail (LOD) consitent with the given error tolerances epsDist and epsParams. Step 1820 initializes each selected cell with N SurfaceNet nodes annotated with their initial surface cells 1821. The number N of nodes can be selected 1815 by the user, from the size of the cell when projected onto an image, or from the cell size.

Step 1830 builds the SurfaceNet 1831 by establishing links between neighboring SurfaceNet nodes. This step also produces a surface triangle list 1832 where the vertices of the triangles correspond to the nodes and the edges of the triangles are determined by the links in the SurfaceNet.

Step 1840 changes the location of the nodes to reduce the total surface energy. Contributions to the energy in the SurfaceNet energy can include energy due to the spacing of neighboring nodes 1841, the distance between nodes and the HDF iso-surface 1842, and constraints that keep the nodes inside theit initial surface cells 1843. The change in the SurfaceNet energy after adjusting all of the nodes in the SurfaceNet is a SurfaceNet energy delta 1841.

Step 1850 tests if the SurfaceNet energy delta is less than a given tolerance epsEnergy 1851. If false 1852, then continue at step 1840 and change the node locations until true 1853. When true 1853, the final positions of the SurfaceNet nodes 1854 are output.

Step 1860 reconstructs the appearance parameters and distance field gradients at the final node positions using the fundamental methods described above to produce the final triangle vertices 1861. By applying these final vertices to the surface triangle list 1832, the final triangle model 1890 is generated.

Method for Converting an HDF Using Primitive a Look-up Table

Figure 25:
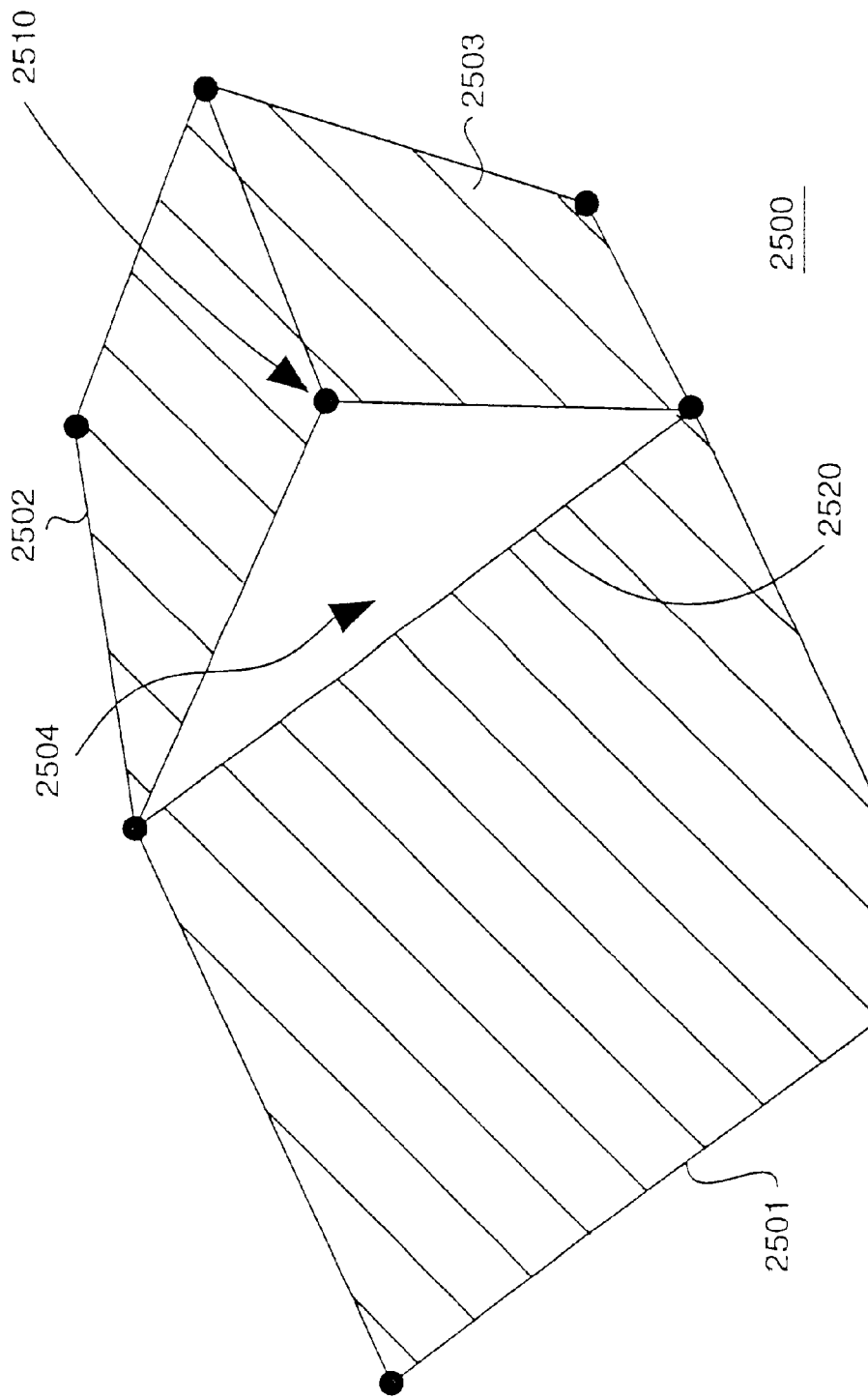
FIG. 25 is a diagram of neighboring cells at different resolution.

FIG. 25 shows a portion 2500 of a surface represented by quadrilateral primitives. This figure illustrates surface "gaps" or "cracks" that can appear in patched parametric representations when the vertices of neighboring primitives are not shared. For example, there is a gap 2504 between primitives 2501, 2502, and 2503 because a vertex 2510 that is shared by 2502 and 2503 is not shared by 2501. Numerical errors or curvature in the iso-surface used to locate the vertex 2510 can result in the vertex 2510 not lying on the edge 2520 of 2501, resulting in the gap 2504.

When converting HDFs to parametric representations, gaps can be introduced between primitives generated from adjacent cells with different resolutions in the HDF tree structure. The following method addresses the gaps problem when it generates surface primitives using a primitive lookup table.

Figure 26:
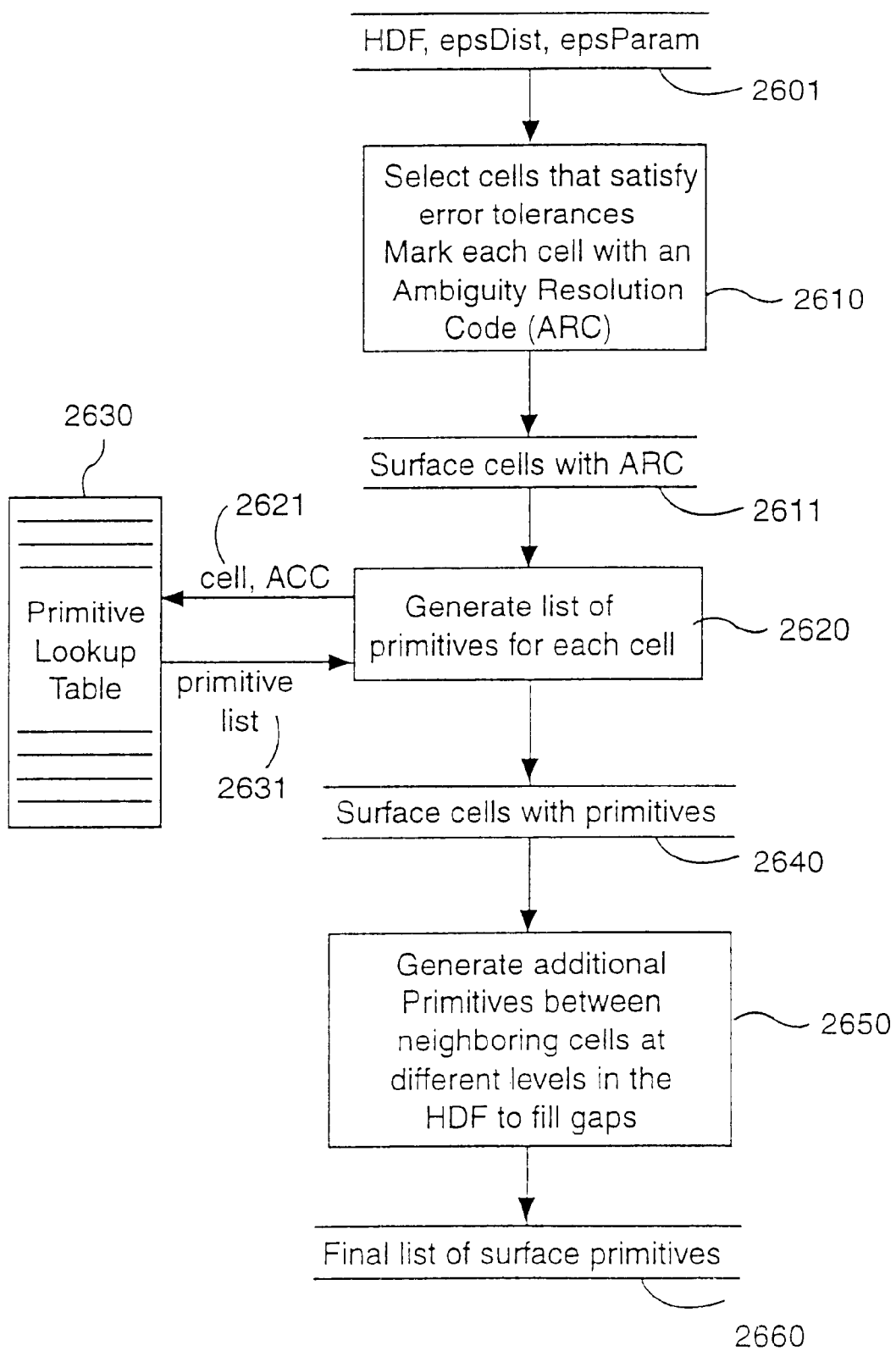
FIG. 26 is a flow diagram of a method for converting the HDF using primitive look-ups.

FIG. 26 shows a method 2600 for converting an HDF to a list of geometric primitives 2660 using a primitive look-up table 2630. The input 2601 to the conversion method 2600 is an HDF and error tolerances epsDist and epsParams.

Step 2610 selects surface cells 2611 of the HDF that satisfy a level of detail (LOD) consitent with the given error tolerances epsDist and epsParams 2601. Each selected surface cell is marked with an ambiguity-resolution code (ACC). The ACC is used to resolve topological ambiguities during processing of the surface cell.

Step 2620 uses a primitive look-up table 2630 to generate a list of primitives 2631 representing the iso-surface for each cell and its ARC 2621. Surface cells and their associated primitives 2640 are then passed to step 2650 which examines the vertices of the neighboring cells having different levels in the HDF tree to detect gaps in the surface. If gaps exist, additonal primitives are generated to fill the gaps. These additional primitives plus the list or primitives 2640 form the final list of primitives 2660.

Because HDFs represent flat areas of the iso-surface with big cells and do not require all cells to be at the resolution of the finest detail in the surface, this method can produce significantly fewer primitives, e.g., triangles, then conventional algorithms, such as Marching Cubes, which convert regularly sampled volumes to primitives, see Lorensen et al. "Marching Cubes: A High Resolution 3D Surface Construction Algorithm," Proceedings of SIGGRAPH 1987, Computer Graphics, Vol. 21(4): pp. 163–169, 1987.

Rendering

The following sections describe four methods for rendering hierarchical distance fields.

Rendering HDFs Using Analytic Ray Casting

Figure 19:
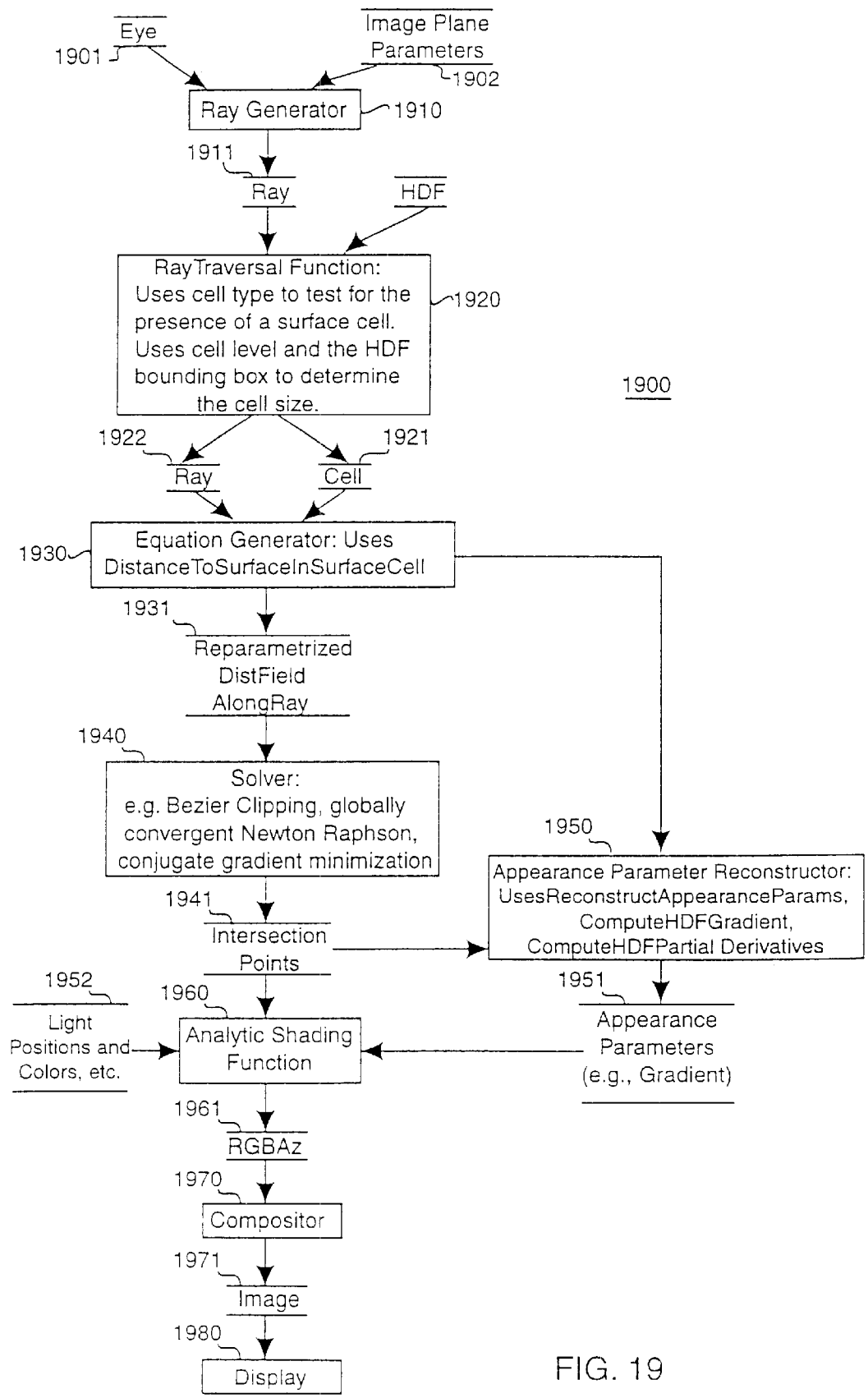
FIG. 19 is a flow diagram of a method for rendering the HDF using analytic ray casting.

As shown in FIG. 19, one method 1900 for rendering an HDF uses analytical ray casting. Step 1910 takes a viewpoint 1901 and image plane parameters 1902 as input to produce rays 1911. Step 1920 casts the rays through the HDF. As the rays pass through the HDF, surface cells are detected. The level at which a surface cell is found in the HDF and the bounding box parameters are used to determine the size of the surface cell. The output of this step is a surface cell 1921 and an associated ray 1922.

Step 1930 reparametrizes the distance field along the ray using an equation generator that uses the fundamental method DistanceToSurfaceInSurfaceCell described above. Step 1940 identifies points 1941 where the ray 1922 intersects an iso-surface of the distance field within the surface cell. Step 1950 generates appearance parameters, for example gradients of the distance field, for the cell 1921 at the intersection points 1941 using some of the fundamental methods described above.

An analytic shading function 1960 produces color and opacity values 1961 for pixels from the ray intersection points 1941, from appearance parameters 1951 at those intersection points, and from scene parameters such as light positions and colors 1952 specified by the graphics system. The values 1961 are composited in step 1970 to generate an image 1971 that can be sent to a display 1980.

Rendering HDFs Using Sampled Ray Casting

Figure 20:
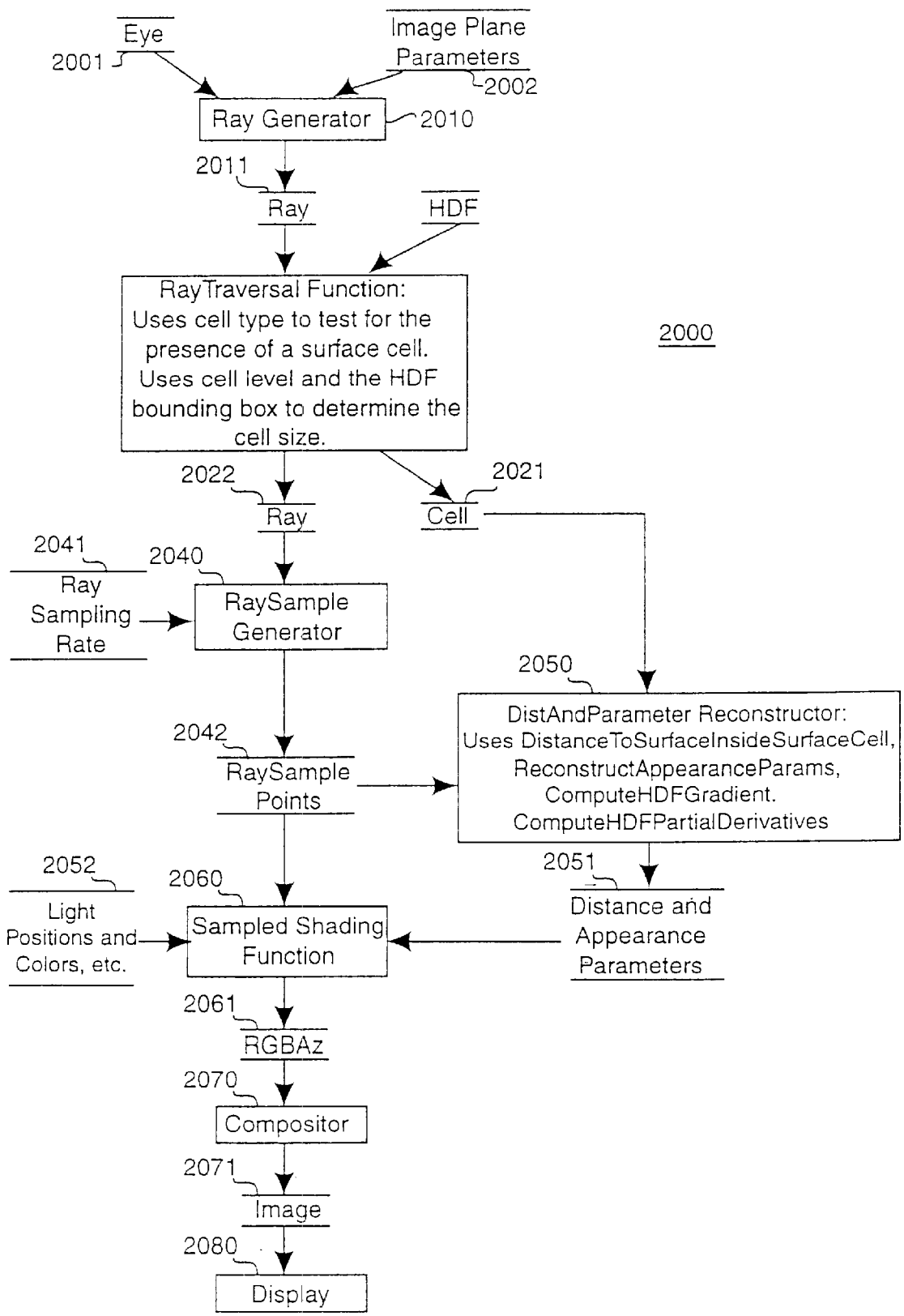
FIG. 20 is a flow diagram of a method for rendering the HDF using sampled ray casting.

As shown in FIG. 20, a method 2000 renders an HDF using sampled ray casting. Step 2010 takes a viewpoint 2001 and image plane parameters 2002 as input to produce rays 2011. Step 2020 casts the rays through the HDF. As the rays pass through the HDF, surface cells are detected. The level at which a cell is found in the HDF and the bounding box parameters are used to determine the size of the surface cell. The output of this step is a surface cell 2021 and the associated ray 2022.

Step 2040 takes a ray sample rate 2041 as input to generate ray sample points 2042. Step 2050 takes as input cells 2021 and the ray sample points as input to determine distance and appearance parameters using the fundamental methods described above.

A sampled shading function 2060 produces color and opacity values 2061 for pixels from the ray sample points 2042, from distance and appearance parameters 2051 at those sample points, and from scene parameters such as light positions and colors 2052 specified by the graphics system. The values 2061 are composited in step 2070 to generate an image 2071 that can be sent to a display 2080.

Rendering HDFs Using Approximate Geometry Primitives

Figure 21:
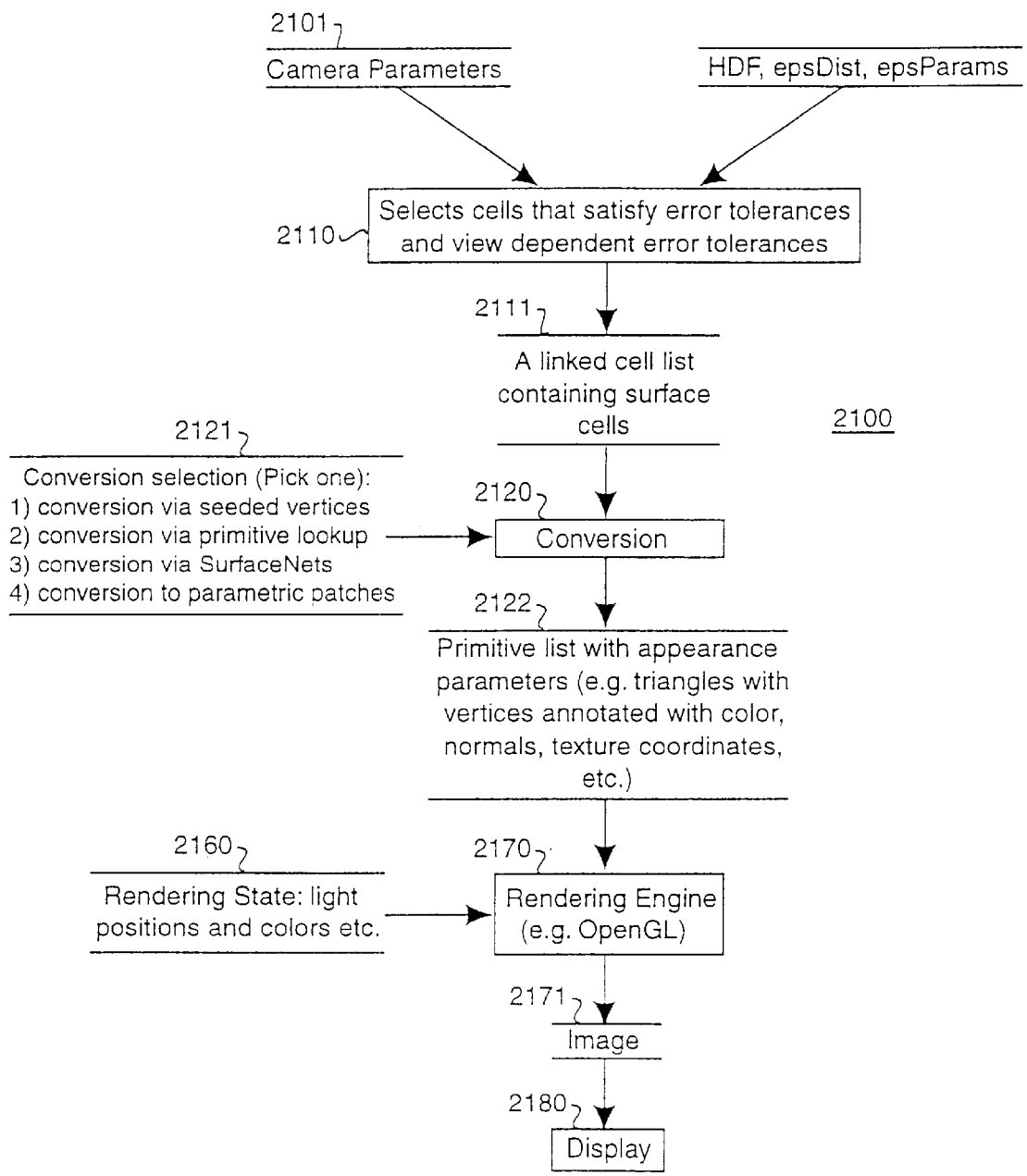
FIG. 21 is a flow diagram of a method for rendering the HDF using approximate geometry primitives.

As shown in FIG. 21, a method 2100 renders an HDF using geometry primitives. Step 2110 takes as input camera parameters 2101, the HDF, and error tolerances, epsDist and epsParams. Surface cells that satisfy the given error tolerances as well as any view-dependent error tolerances are stored in a linked cell list 2111.

Step 2120 converts the surface cells in the linked cell list 2111 to a list of geometry primitives 2122. The primitives 2122 can be, for example, triangles with vertices annotated with color, normals, texture coordinates, etc. A method for conversion 2121 can be one of the conversion methods described above.

A rendering engine 2170, e.g. OpenGL, takes a rendering state 2160 as input to generate an image 2171 which can be displayed 2180.

Editing Hierarchical Distance Fields

Figure 23:
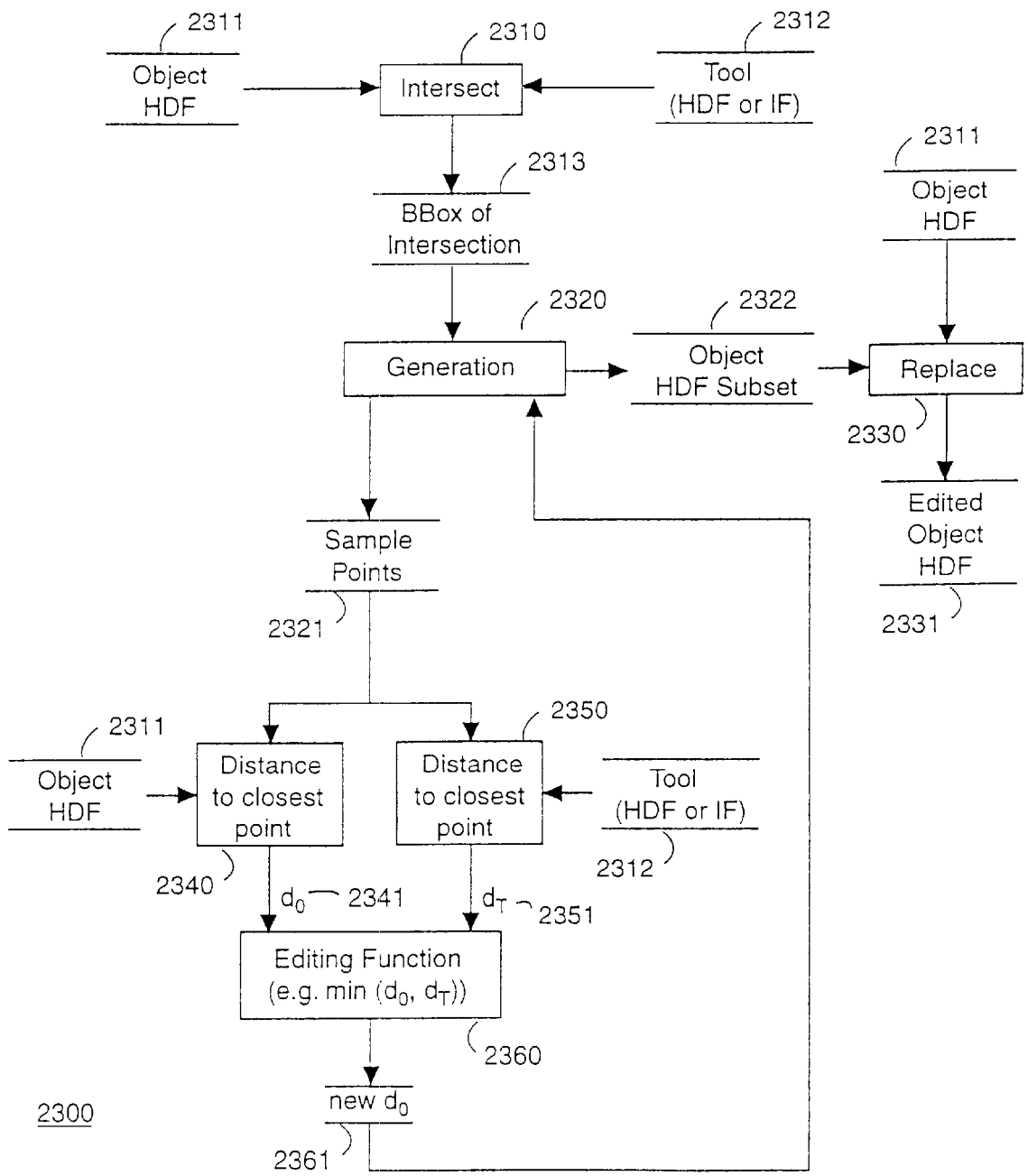
FIG. 23 is a flow diagram of a method for applying an editing tool to the HDF.

FIG. 23 shows a method 2300 for applying a tool to edit an HDF. Step 2310 takes as input the object HDF 2311 and a description of the tool 2312 either as an HDF, an implicit function, or some other representation, and generates an editing bounding box 2313 of the region where the object HDF 2311 and the tool representation 2312 intersect. Step 2320 generates an edited subset of the object HDF 2322 corresponding to this intersection region which replaces the current corresponding subset of the object HDF 2311 at 2330, producing the edited object HDF 2331.

The step 2320 can use a generation method such as the main loop of the top-down generation method 1120 described above with the difference that distance values at sample points within each cell are computed in the following way.

Each sample point 2321 of each cell that is considered during generation is queried by 2340 and by 2350 using some of the fundamental methods described above to determine a distance value for the object 2311 and the tool 2312 at the sample point 2321. The object distance value, $d_O$ 2341, and the tool distance value, $d_T$ 2351, are then combined according to an editing function in step 2360. Some examples of editing functions include: subtracting the tool shape from the object shape, with a corresponding editing function $d_{new}=\min(d_O,-d_T)$; intersecting the object shape and the tool shape, with a corresponding editing function $d_{new}=\min(d_O, d_T)$; and adding the tool shape to the object shape, with a corresponding editing function $d_{new}=\max(d_O, d_T)$. Other editing functions such as those that affect the smoothness of the surface or the appearance parameters are also possible.

The resultant new distance value, new do 2361 is the sample value of the edited object for the sample point 2321 used in the generation 2320.

An Application for Sculpting Hierarchical Distance Fields

Figure 22:
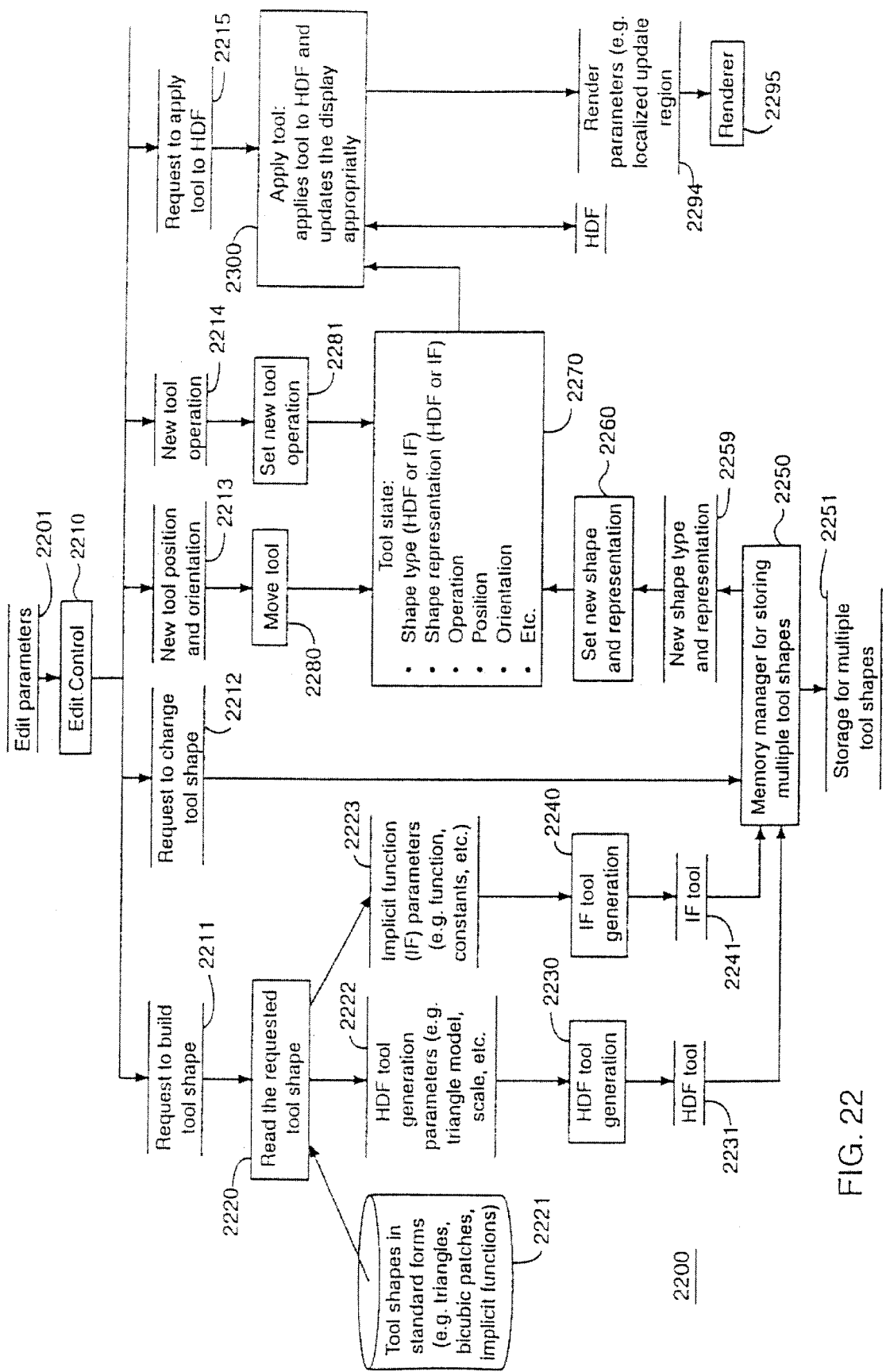
FIG. 22 is a flow diagram of a method for editing the HDF.

As shown in FIG. 22, an HDF can be edited by applying a tool according to a method 2200 which includes an edit control function 2210 that takes editing parameters 2201 as input and generates requests to build new tool shapes 2211, change the current tool shape 2212, change the tool position and orientation 2213, change the tool operation 2214, and apply the tool to the HDF 2215.

Build New Tool Shape

Step 2220 reads the requested tool shape from a tool shape database 2221. Tool shapes can be stored in the database as standard common forms, e.g., triangles, bicubic patches, implicit functions, etc. The tool shape can be read, for example, as parameters to generate an HDF representation of the tool 2222 or as parameters to generate an implicit function representation (IF) of the tool 2223.

Step 2230 generates an HDF tool 2231 from the tool parameters 2222, and step 2240 generates an HDF implicit function tool 2241 from tool parameters 2223. In either case, step 2250 stores the tool shape in a database 2251.

Change Current Tool Shape

To change the current tool shape, a requested tool is retrieved from the tool database 2251 via the memory manager 2250 and step 2260 sets the new shape type and representation 2259 in the tool state 2270. The tool state 2270 can include a shape type (e.g. HDF-type or IF-type), the representation of the tool (e.g. the tool's HDF or IF), the editing operation, the tool position and orientation, and the like.

Change the Tool State

The tool's position or orientation and the tool's editing operation can be changed in the tool state 2270 via steps 2280 and 2281 respectively.

Apply Tool

Step 2300 applies a tool having a predetermined state 2270 to edit the HDF. The edited HDF can be rendered 2295 according to predetermined rendering parameters such as the bounding box of the edited region 2294.

A Sculpting System for Hierarchical Distance Fields

Figure 24:
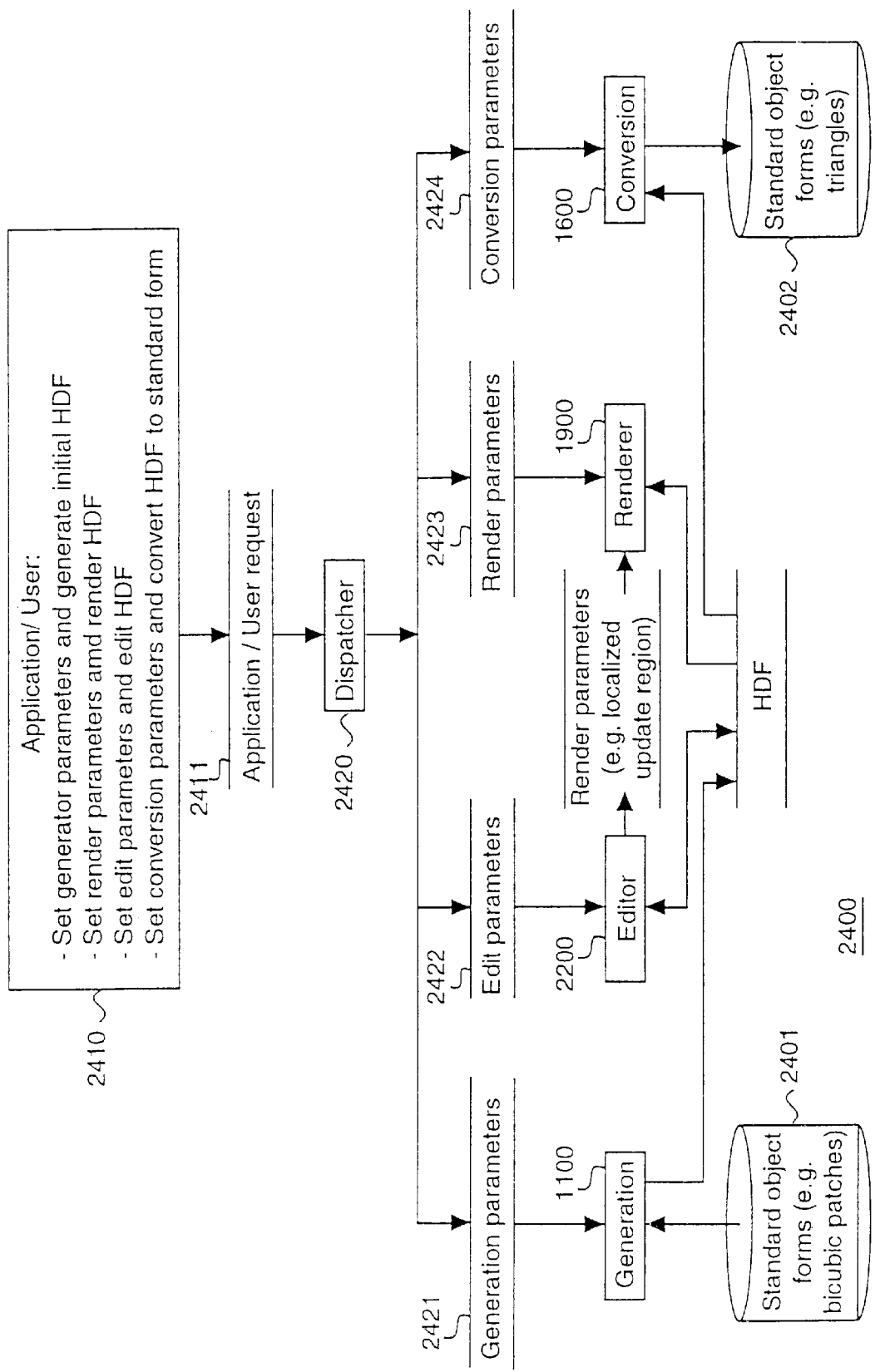
FIG. 24 is a flow diagram of a method for sculpting an HDF.

FIG. 24 depicts a system 2400 for an application for sculpting HDFs. In 2410, the application or a user of the application can set parameters for the system such as parameters for generating an initial HDF to be sculpted by the application 2421, parameters for rendering 2423, parameters for editing 2422, or parameters for converting the edited HDF to other standard forms 2424. Step 2410 can also initiate requests 2411 to the system to generate an initial HDF, or to perform rendering, editing, or conversion to standard forms. These requests and the associated parameters are distributed by the dispatcher 2420 to the generation 1100, editing 2200, the rendering 1900, and conversion 1600 methods as appropriate. The methods act on the HDF in accordance with the application's requests.

Representing A Color Gamut with a Hierarchical Distance Field

A part of computer graphics deals with color reproduction on input and output devices such scanners, display monitors, and printers. The colors can be, for example, spot colors, such as tints, synthetic colors produced by rendering software, and digitized colors of photographs from scanners. Generally, input and output devices are capable of accepting and showing only a subset of all visible colors. This bow or arc of colors is called the device color gamut. Colors produced by a particular rendering system or input system may or may not fall within the gamut of the target display device. If a color falls outside this gamut, it cannot be reproduced correctly by the target display device—leading to undesirable results.

To address this problem, it is desirable to be able to test colors to determine whether they fall within the gamut of the target rendering device. It is also desirable for the application to suggest alternative colors or to automatically correct out-of-gamut colors to fit the device color gamut. For high resolution digitized images containing millions of colors, the test or the correction process must be very fast. Furthermore, if the color is modified to fall within the gamut, then it must be done in a way that is consistent with the original intent or color aesthetics of the original rendering or input system.

In the prior art, a three-dimensional look-up table (LUT) is generated for the device color gamut that encodes Boolean test results of "inside-gamut" versus "outside-gamut" at discrete sample points in color space. Each dimension, or axis, of the LUT represents a channel of a tri-stimulus color such as RGB, HSV, and the like. When testing a given color using the LUT, if the color does not lie at sample points in the LUT, the Boolean test results from neighboring sample points in the LUT are averaged using some interpolation scheme (e.g., trilinear interpolation) to predict the Boolean test result for the given color. In the prior art, if the result of the Boolean test is "inside-gamut," then the color is displayed as is. If the result is "outside-gamut," either the application warns the user that manual intervention is required to adjust the rendering color or some substitution algorithm is employed to replace the given color with a color that is within the device color gamut.

One of the problems with the above prior art is that the LUT basically represents the color gamut as a binary sampled volume, where sample values can either be "inside-gamut" or "outside-gamut". As discussed above, when sample values in a sampled volume change abruptly at an object surface, the surface cannot be accurately reconstructed unless the volume is sampled at sufficiently high sampling rates. In fact, a binary sampled volume such as the color LUT of the prior art has infinite spatial frequency components and the surface can never be accurately reconstructed. The result is that the Boolean LUT test cannot provide an accurate inside-gamut vs. outside-gamut test for colors near the surface of the device color gamut, resulting in noticeable color errors in the displayed image.

In U.S. Pat. No. 5,740,076 "System for describing a color gamut in a graphical data processing system," issued to Lindbloom on Apr. 14, 1998 the above problem is partially addressed. There, a color gamut is analyzed using a three-dimensional LUT populated with samples of a continuous function rather than a discontinuous function. The function chosen is an encoded distance between the sample color and the closest color on the gamut surface. In other words, the LUT stores the distance map of the surface of the device color gamut.

The use of a regularly sampled distance map to represent the distance field for the device color gamut is subject to all of the problems discussed above for distance maps. In addition, in this system, a given input color is analyzed to produce three outputs that are used by the graphical processing system: the interpolated distance from the gamut surface, the Boolean test result of "inside-gamut" vs. "outside-gamut," and a classification of the distance into one of a number (at least two) of distance ranges. Each of these outputs are used in a graphical interface to guide a user making color changes in the rendering system. The system does not include a method for replacing a given color that is outside of gamut with an in-gamut color.

Figure 27:
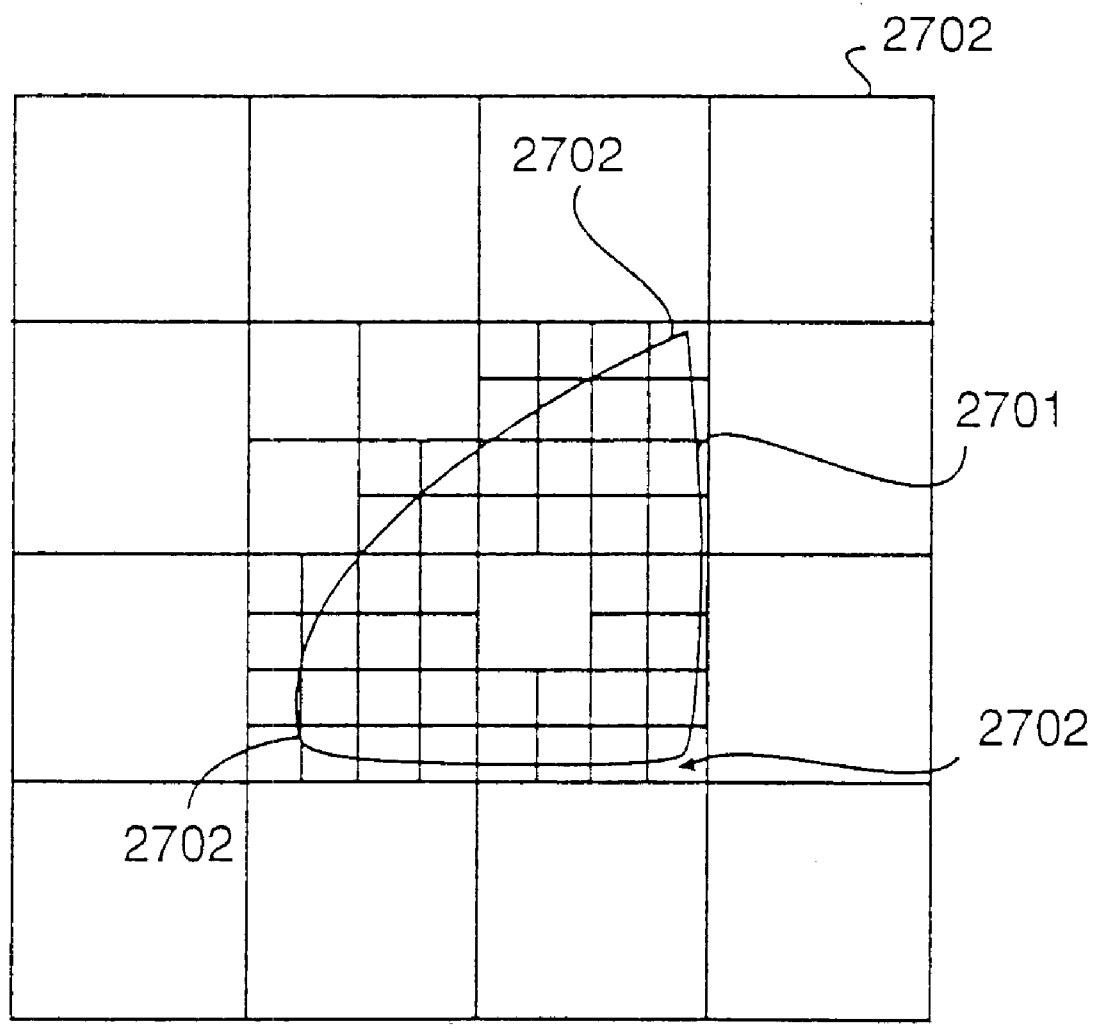
FIG. 27 is diagram of a bounding box enclosing partitioned cells of an HDF representing a color gamut.

FIG. 27 shows how a detail directed hierarchical distance field 2700 can be used to represent a color gamut 2701. In this application, the values of the cells express signed distances to a closest point on the gamut surface. As an advantage, the gamut HDF can represents detail 2702 of the surface much better than prior art techniques at reduced memory cost. Using some of the fundamental methods described above, a given color can be tested to see if it lies inside or outside of the color gamut surface and, if the given color lies outside of gamut, the closest point on the color gamut surface can be found and used by a color substitution algorithm for replacing any given color.

Advantages of Hierarchical Distance Fields

Hierarchical distance fields according to the invention combine the advantages of parametric surfaces, and implicit surfaces, and sampled volumes. HDFs can represent object interiors to any desired level of resolution using a sparse data structure. With HDFs, it is easy to differentiate between the inside and the outside of objects. HDFs have an easy and natural conversion to conventional surface representations because of their spatial organization. Using an HDF representation in sampled volumes allows lower sampling rates with more accurate and precise surface representation than intensity-based representations of prior art methods. By sampling adaptively to local surface detail instead of at a fixed resolution enables the HDF to have low sampling rates near relatively flat surfaces resulting in a significant reduction in memory needs. The HDF data structure provides efficient memory storage and access. HDFs enable a practical sampled representation of large objects with fine surface detail. For example, relatively flat object with dimensions on the order of one meter can efficiently be represented by an HDF even when the object has some surface detail at millimeter resolution This invention is described using specific terms and examples. It is to be understood that various other adaptations and modifications may be made within the spirit and scope of the invention. Therefore, it is the object of the appended claims to cover all such variations and modifications as come within the true spirit and scope of the invention.

We claim:

1. A method for representing a color gamut as a detail directed hierarchical distance field, comprising the steps of:

generating a distance field for the color gamut;

enclosing the distance field with a bounding box;

partitioning the enclosed continuous distance field into a plurality of cells, each cell having a size corresponding to detail of the continuous distance field and a location with respect to the bounding box;

sampling, for each cell, a set of values of the enclosed continuous distance field;

specifying, for each cell, a method for reconstructing the portion of the continuous distance field enclosed by the cell; and storing, for each cell, the size, the location, the set of values, and the method for reconstructing in a memory to enable reconstruction of the color gamut by applying the reconstruction methods of the cells to the values.

2. The method of claim 1 wherein the values include signed distances to a surface of the color gamut, and further comprising the steps of:

identifying cells entirely outside the color gamut as exterior cells;

identifying cells entirely inside the color gamut as interior cells; and identifying cells intersecting the surface of the color gamut as surface cells.

3. The method of claim 1 wherein the values include signed distances to a surface of the color gamut, and further comprising the steps of:

selecting an arbitrary point in the enclosed distance field;

identifying a particular cell enclosing the selected point;

evaluating the reconstruction method of the identified cell using the values of the identified cell to determine a smallest distance from the arbitrary point to the surface of the color gamut.

4. The method of claim 3 wherein the arbitrary point is outside the surface when the smallest distance is negative, inside the surface when the distance is positive, and on the surface when the distance is zero.

5. The method of claim 1 wherein the values include signed distances to a surface of the color gamut, and further comprising the steps of:

selecting an arbitrary point in the enclosed distance field; and locating a closest point on the surface of the color gamut to the arbitrary point.

6. The method of claim 1 wherein the detail of the distance field is determined by a gradient of the distance field.

7. The method of claim 1 wherein a particular value of the set includes a partial derivative of the distance field.

8. The method of claim 1 wherein the values include signed distances to a surface of the color gamut, and further comprising the steps of:

selecting an arbitrary point in the enclosed distance field;

identifying a particular cell enclosing the selected point;

evaluating the reconstruction method of the identified cell using the values of the identified cell to determine a partial derivative of the distance field at the arbitrary point.

9. The method of claim 1 further comprising the step of:

terminating the partitioning when a predetermined detail of the surface is reached.

10. The method of claim 1 further comprising the step of:

limiting the number of times a particular cell is partitioned.

11. The method of claim 1 wherein the partitioning further comprises the steps of:

partitioning, in a top-down manner, the bounding box such that each partitioning yields smaller sized cells until a portion of the distance field enclosed by each cell can substantially be reconstructed by the method for reconstructing to a predetermined surface representation error.

12. The method of claim 1 wherein the partitioning further comprises the steps of:

partitioning the bounding box into equal sized cells such that a portion of the distance field enclosed by each cell can substantially be reconstructed by the method for reconstructing to a predetermined surface representation error; and combining, in a bottom-up manner, groups of neighboring cells into larger cells as long as the portion of the distance field enclosed by the larger cell can substantially be reconstructed to the surface representation error.

* * * * *